US011169619B2

(12) United States Patent
Kim et al.

(10) Patent No.: US 11,169,619 B2
(45) Date of Patent: Nov. 9, 2021

(54) ELECTRONIC DEVICE COMPRISING FLEXIBLE DISPLAY, AND KEY BUTTON ARRANGEMENT STRUCTURE APPLIED TO SAME

(71) Applicant: Samsung Electronics Co., Ltd., Suwon-si (KR)

(72) Inventors: Gidae Kim, Suwon-si (KR); Seunghoon Ko, Suwon-si (KR); Jungchul An, Suwon-si (KR); Joungmin Cho, Suwon-si (KR); Kwangtai Kim, Suwon-si (KR); Hyungsup Byeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/733,340

(22) PCT Filed: Jan. 7, 2019

(86) PCT No.: PCT/KR2019/000213
§ 371 (c)(1),
(2) Date: Jul. 1, 2020

(87) PCT Pub. No.: WO2019/139314
PCT Pub. Date: Jul. 18, 2019

(65) Prior Publication Data
US 2021/0117012 A1    Apr. 22, 2021

(30) Foreign Application Priority Data

Jan. 9, 2018    (KR) .................. 10-2018-0002696

(51) Int. Cl.
*G06F 3/02* (2006.01)
*G06F 3/044* (2006.01)
(Continued)

(52) U.S. Cl.
CPC ............ *G06F 3/0202* (2013.01); *G06F 3/044* (2013.01); *H04B 1/3827* (2013.01); *H04M 1/23* (2013.01);
(Continued)

(58) Field of Classification Search
CPC .................. G06F 3/0202; G06F 3/044; G06F 2203/04102; G06F 1/1652; G06F 1/1624;
(Continued)

(56) References Cited

U.S. PATENT DOCUMENTS

2010/0167791 A1    7/2010 Lim
2016/0233037 A1    8/2016 Lee et al.
(Continued)

FOREIGN PATENT DOCUMENTS

EP    1542434 A1    6/2005
EP    2413573 A1    2/2012
(Continued)

OTHER PUBLICATIONS

International Search Report and Written Opinion of the International Searching Authority in connection with International Application No. PCT/KR2019/000213 dated Apr. 12, 2019, 9 pages.
(Continued)

*Primary Examiner* — Shaima Q Aminzay

(57) ABSTRACT

According to various embodiments, an electronic device may include a first structure including a first plate including a first surface and a second surface facing away from the first surface, and at least one side surface, a second structure including a second plate facing the second surface of the first plate; a first side wall extended to the second plate; a second side wall extending to the first side wall and the second plate and facing the side surface; and a third side wall extending to the first side wall and the second plate, parallel to the second side wall and facing the side surface, wherein the
(Continued)

second plate, the first side wall, and the second side wall and the third side wall together form a trough with one side opened to receive at least part of the first structure, the first structure is movable between an open state and a closed state with respect to the second structure in a first direction parallel to the second plate and the second side wall, and the first structure is placed at a first distance from the first side wall in the closed state, and placed at a second distance which is greater than the first distance from the first side wall in the open state, at least one mechanical button mounted on the second side wall, and moving toward the first structure from outside of the second structure, and a sensing circuit disposed between the side wall and the second side wall with at least partial area, and configured to detect the movement of the mechanical button. Besides, various embodiments are possible.

11 Claims, 22 Drawing Sheets

(51) Int. Cl.
  *H04B 1/3827* (2015.01)
  *H04M 1/23* (2006.01)
  *H04M 1/02* (2006.01)
(52) U.S. Cl.
  CPC ..... *G06F 2203/04102* (2013.01); *H04M 1/02* (2013.01); *H04M 1/233* (2013.01)
(58) Field of Classification Search
  CPC ...... G06F 1/1681; H04B 1/3827; H04M 1/23; H04M 1/02; H04M 1/233; H04M 2250/22; H04M 1/0237; H04M 1/0268; H04M 1/236; H04M 1/0235
  USPC ...................................................... 455/575.1
  See application file for complete search history.

(56) References Cited

U.S. PATENT DOCUMENTS

| | | | |
|---|---|---|---|
| 2017/0083109 | A1 | 3/2017 | Li et al. |
| 2017/0245376 | A1 | 8/2017 | Song et al. |
| 2017/0315591 | A1 | 11/2017 | Shin et al. |
| 2017/0364119 | A1* | 12/2017 | Lee ........................ G06F 1/1652 |

FOREIGN PATENT DOCUMENTS

| | | |
|---|---|---|
| EP | 3714348 A1 | 9/2020 |
| EP | 3747247 A1 | 12/2020 |
| KR | 10-2010-0079100 A | 7/2010 |
| KR | 10-2016-0097102 A | 8/2016 |
| KR | 10-2017-0050270 A | 5/2017 |
| KR | 10-2017-0059815 A | 5/2017 |
| KR | 10-2017-0099626 A | 9/2017 |
| WO | 2019/164215 A1 | 8/2019 |
| WO | 2019/198978 A1 | 10/2019 |

OTHER PUBLICATIONS

Supplementary European Search Report dated Jan. 12, 2021 in connection with European Patent Application No. 19 73 8061, 10 pages.

* cited by examiner

An electronic device including a flexible display and a key button arrangement structure applied thereto.

ELECTRONIC DEVICE COMPRISING FLEXIBLE DISPLAY, AND KEY BUTTON ARRANGEMENT STRUCTURE APPLIED TO SAME

CROSS-REFERENCE TO RELATED APPLICATIONS

This application is a 371 National Stage of International Application No. PCT/KR2019/000213, filed Jan. 7, 2019, which claims priority to Korean Patent Application No. 10-2018-0002696, filed Jan. 9, 2018, the disclosures of which are herein incorporated by reference in their entirety.

BACKGROUND

1. Field

Various embodiments of the present invention relate to an electronic device including a flexible display and a key button arrangement structure applied thereto.

2. Description of Related Art

As a functional gap for each manufacturer significantly reduces in recent, a portable electronic device is gradually slimmed to satisfy consumer's preference and is devoted to improve usability. However, unlike the electronic device gradually getting small and slim, electronic devices having a larger display are being released to support a multi-media function or more functions.

SUMMARY

In general, a portable electronic device is progressing in various forms to secure a more extended display area without affecting portability. For example, if a first body and a second body are used at an overlapped position, the electronic device may include a slide type electronic device unfolded in a sliding manner with respect to each other or a foldable type electronic device disposed to overlap or unfold the first body and the second body using a flexible display.

In the electronic devices, a key button may be disposed on a moving body of the first body or the second body, and operational convenience may be deteriorated by changing a position of the key button according to opening and closing operations.

Various embodiments of the present invention may provide an electronic device including a flexible display and a key button arrangement structure applied thereto.

Various embodiments may provide an electronic device including a flexible display implemented to enable uniform key input manipulation regardless of whether the display is expanded, and a key button arrangement structure applied thereto.

Various embodiments may provide an electronic device including a flexible display for efficiently using a mounting space by detecting an input and a position of a key button using a display, and a key button arrangement structure applied thereto.

According to various embodiments, an electronic device may include a first structure including a first plate including a first surface and a second surface facing away from the first surface, and at least one side surface, a second structure including a second plate facing the second surface of the first plate; a first side wall extended to the second plate; a second side wall extending to the first side wall and the second plate and facing the side surface; and a third side wall extending to the first side wall and the second plate, parallel to the second side wall and facing the side surface, wherein the second plate, the first side wall, and the second side wall and the third side wall together form a trough with one side opened to receive at least part of the first structure, the first structure is movable between an open state and a closed state with respect to the second structure in a first direction parallel to the second plate and the second side wall, and the first structure is placed at a first distance from the first side wall in the closed state, and placed at a second distance which is greater than the first distance from the first side wall in the open state, at least one mechanical button mounted on the second side wall, and moving toward the first structure from outside of the second structure, and a sensing circuit disposed between the side wall and the second side wall with at least partial area, and configured to detect the movement of the mechanical button.

According to various embodiments, a portable communication device may include a first structure including a first plate including a first surface and a second surface facing away from the first surface, and at least one side surface, a second structure including a second plate facing the second surface of the first plate and at least one side wall extending from the second plate to face at least one side surface, wherein the second plate and the at least one side wall together form a trough with one side opened to receive at least part of the first structure, the first structure is movable between an open state and a closed state with respect to the second structure in a first direction parallel to the at least one side wall, and the first structure is placed at a first distance from the first side wall in the closed state, and placed at a second distance which is greater than the first distance from the first side wall in the open state, at least one mechanical button mounted on the at least one side wall, and moving toward the first structure from outside of the second structure, and a sensing circuit disposed between the side surface and the side wall with at least partial area, and configured to detect the movement of the mechanical button.

According to various embodiments, a portable communication device may include a first structure including a first plate including a first surface and a second surface facing away from the first surface, and at least one side surface, a second structure including a second plate facing the second surface of the first plate and at least one side wall extending from the second plate to face the at least one side surface, coupling with the first structure, and disposed to move a specific reciprocating distance with respect to the first structure, at least one mechanical button mounted on the at least one side wall to move toward the first structure from outside of the second structure and a sensing circuit disposed between the side surface and the side wall with at least partial area, and configured to detect the movement of the mechanical button.

According to various embodiments, even if a size of an electronic device is changed, a position of a key button is not changed, and thus operational convenience of the key button may be improved.

According to various embodiments, since an electronic device detects an input and a position of a key button using a sensor included in a display, a mounting space may be used efficiently.

DETAILED DESCRIPTION

Figure 1:
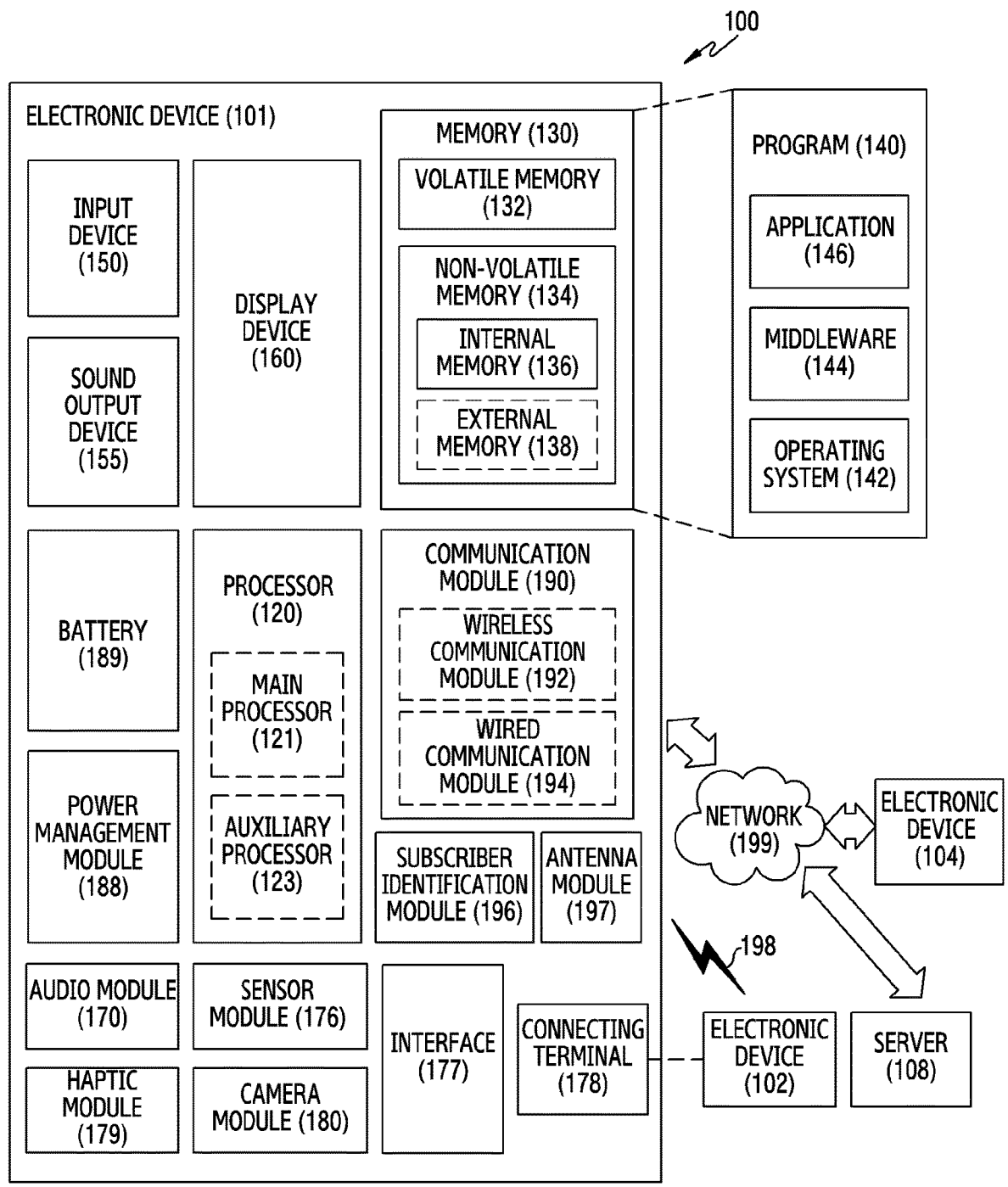
FIG. 1 is a block diagram of an electronic device in a network environment, including an expandable flexible display, according to various embodiments of the present invention.

FIG. 1 is a block diagram of an electronic device in a network environment, including an expandable flexible display, according to various embodiments of the present invention.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, using subscriber information stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
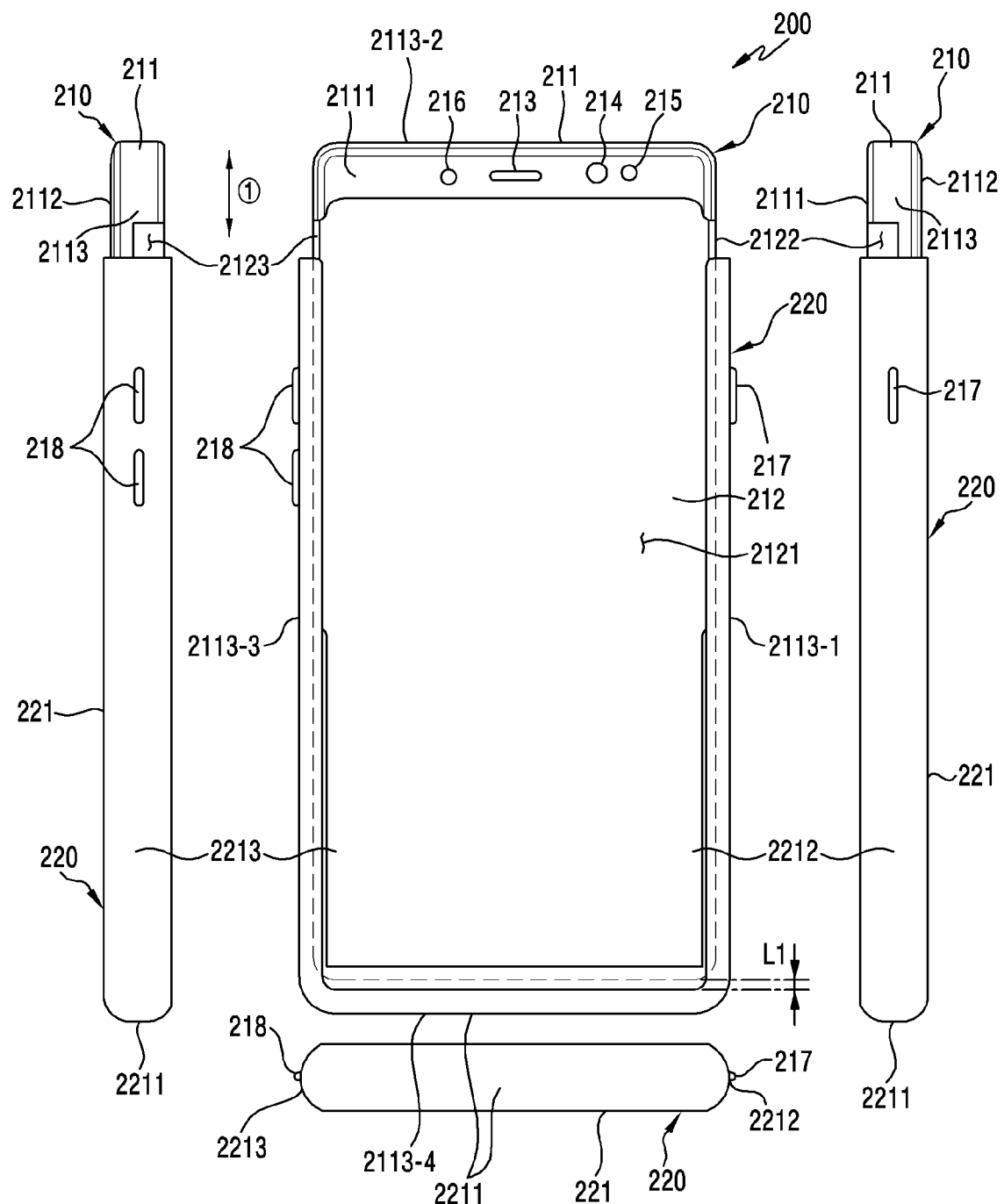
FIG. 2A and FIG. 2B are diagrams illustrating open and closed states of an electronic device according to various embodiments of the present invention.

According to various embodiments of the present invention, the processor 120 may detect an input and/or a position of a key button (e.g., a key button 217 of FIG. 2A) contacted an outer surface of a display using the display (e.g., a display 212 of FIG. 2A). According to an embodiment, the processor 120 may detect open and closed states of the electronic device using a current position of the key button detected from the display. According to an embodiment, the processor may control to set a function of the electronic device based on the detected open and closed state information. For example, the processor may control the display to change a size of a display area of the display, based on the detected open and closed state information.

Figure 2B:
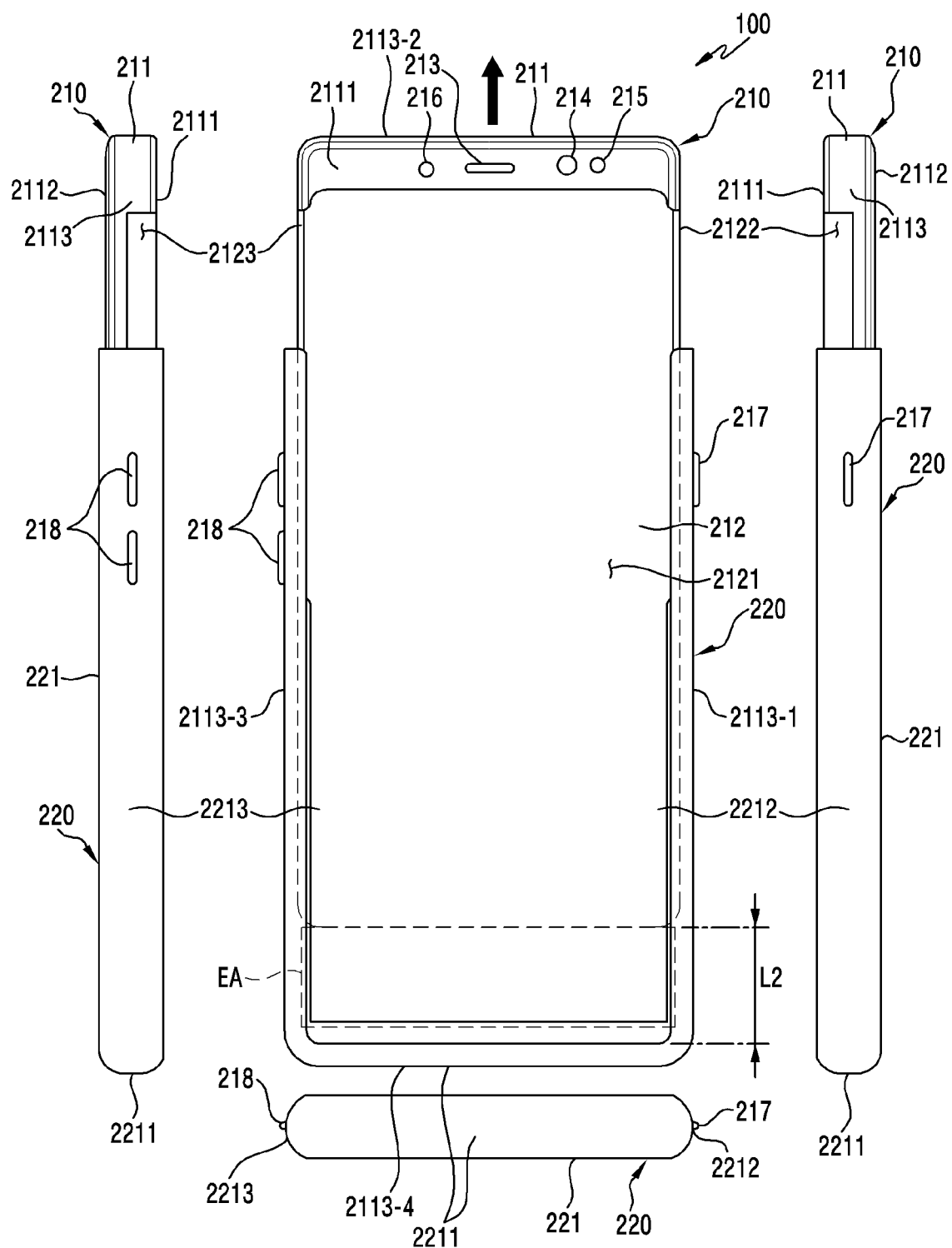

FIG. 2A and FIG. 2B are views illustrating open and closed states of an electronic device according to various embodiments of the present invention.

An electronic device 200 of FIG. 2A and FIG. 2B may be similar at least in part to the electronic device 101 of FIG. 1, or may include other embodiments of the electronic device.

FIG. 2A illustrates that a first structure 210 is closed with respect to a second structure 220, and FIG. 2B illustrates that the first structure 210 is open with respect to the second structure 220.

Referring to FIG. 2A and FIG. 2B, the electronic device 200 may include the first structure 210 and the second structure 220 (e.g., a second plate) movably disposed in the first structure 210. According to an embodiment, the first structure 210 may be disposed to reciprocate by a specific distance (e.g., a specific distance dl of FIG. 3) in a direction ① based on the second structure 220.

According to various embodiments, a first plate 211 of the first structure 210 may include a first surface 2111 and a second surface 2112 facing away from the first surface 2111 and at least one side surface 2113. According to an embodiment, the side surface 2113 may include a first side surface 2113-1 having a first length, a second side surface 2113-2 extending vertically from the first side surface and having a second length shorter than the first side surface, a third side surface 2113-3 extending vertically from the second side surface and disposed to have the first length in parallel to the first side surface, and a fourth side surface 2113-4 extending vertically from the third side surface and disposed to have the second length in parallel to the second side surface. According to an embodiment, the second structure 220 may include a second plate 221, a first side wall 2211 perpendicular to the second plate 221, a second side wall 2212 perpendicular to the first side wall 2211 and the second plate 221 and facing the side surface 2113 and a third side wall 2213 perpendicular to the first side wall 2211 and the second plate 221, in parallel to the second side wall 2212 and facing the side surface 2113. According to an embodiment, the second plate 221, the first side wall 2211, the second side wall 2212 and the third side wall 2213 may be formed as an integral structure. According to an embodiment, according to an embodiment, at least one of the second plate 221, the first side wall 2211, the second side wall 2212 and the third side wall 2213 may be formed as a separate structure, and thus may be formed as the second structure 220 by mutual structural coupling. According to an embodiment, the second plate 221, the first side wall 2211, the second side wall 2212 and the third side wall 2213 may form a trough (e.g., a trough 4101 of FIG. 4A) with one side opened to accommodate at least part of the first structure 210. According to an embodiment, the first structure 210 may move in the open and closed states with respect to the second structure 220 in the first direction parallel to the second plate 221 and the second side wall 2212, and the first structure 210 may operate to be placed at a first distance (a first distance L1 of FIG. 2A) from the first side wall 2211 in the closed state, and to be placed at a second distance (a second distance L2 of FIG. 2B) which is greater than the first distance from the first side wall 2211 in the open state.

According to various embodiments, the electronic device 200 may include a display 212 (e.g., a flexible touch screen display) disposed on the first surface 2111 of the first structure 210. According to an embodiment, the electronic device 200 may include at least one key button 217 and 218 on at least one side surface of left and right side surfaces. According to an embodiment, the key buttons 217 and 218 may be disposed to be exposed or protruded from the second side wall 2212 and/or the third side wall 2213 of the second structure 220. According to an embodiment, the key button may include a button (not shown) for voice commands, a power button 217 or a volume control button 218.

According to various embodiments, the electronic device 200 may include components for performing various functions of the electronic device 200 disposed between the display 212 and the second plate 221 of the second structure. According to an embodiment, the components may include a receiver 213. According to an embodiment, the components may include at least one sensor module 214. The sensor module 204 may include, for example, an illuminance sensor (e.g., an optical sensor), a proximity sensor (e.g., an optical sensor), an infrared sensor, an ultrasonic sensor, a fingerprint recognition sensor, a face recognition sensor or an iris recognition sensor. According to an embodiment, the components may include a camera device 215. According to an embodiment, the components may include an indicator 216 (e.g., a light emitting diode (LED) device) for visually providing state information of the electronic device 200 to a user.

According to various embodiments, the display 212 may include a flat portion 2121 extending across at least part of the first surface 2111 and disposed on the first surface 2111 and a bendable portion (e.g., a bendable portion 620 of FIG. 6A) extending from the flat portion 2121 into a space between the first side wall 2211 and the first structure 210 in the closed state. According to an embodiment, the display 212 may include at least one bent portion 2122 and 2123 extending from the flat portion 2121 to the side surface 2113 of the first plate 211. According to an embodiment, one bent portion 2122 may extend to at least part of the first side surface 2113-1 of the side surface 2113. According to an embodiment, the other bent portion 2123 may extend to at least part of the third side surface 2113-3. Hence, when viewed from the top of the first plate 211, if the first structure 210 is moved from the closed state to the open state, at least part of the bendable portion of the display may be configured to be pulled by a specific display area EA toward the flat portion to substantially form a flat surface between the flat portion 2121 and the first side wall 2211.

According to various embodiments, the bent portion 2122 of the display 212 may be formed in a length in which the key button 217 may always contact or approach, if the first structure 210 moves at a specific reciprocating distance with respect to the second structure 220. According to an embodiment, the electronic device 200 may detect a relative position for the bent portion 2122 of the key button 217 according to an input operation of the key button 217 and/or the opening and closing operation of the first structure 210 using a sensor module (e.g., a touch sensor module or a pressure sensor module) (e.g., a sensing circuit) included in the at least bent portion 2122 of the display 212 regardless of the open and closed states of the first structure 210. According to an embodiment, the electronic device 200 may perform a corresponding function by using the input and/or the position of the detected key button 217.

According to various embodiments, the electronic device may further include a processor (e.g., the processor 120 of FIG. 1) (e.g., an AP). According to an embodiment, the processor may detect a change of the position of the first structure 120 for the second structure 220 at least based on a signal corresponding to the movement of the key button 217 detected using the sensor module (e.g., a sensing circuit). According to an embodiment, the processor may be a separate processor functionally coupled to the sensor module.

Figure 3:
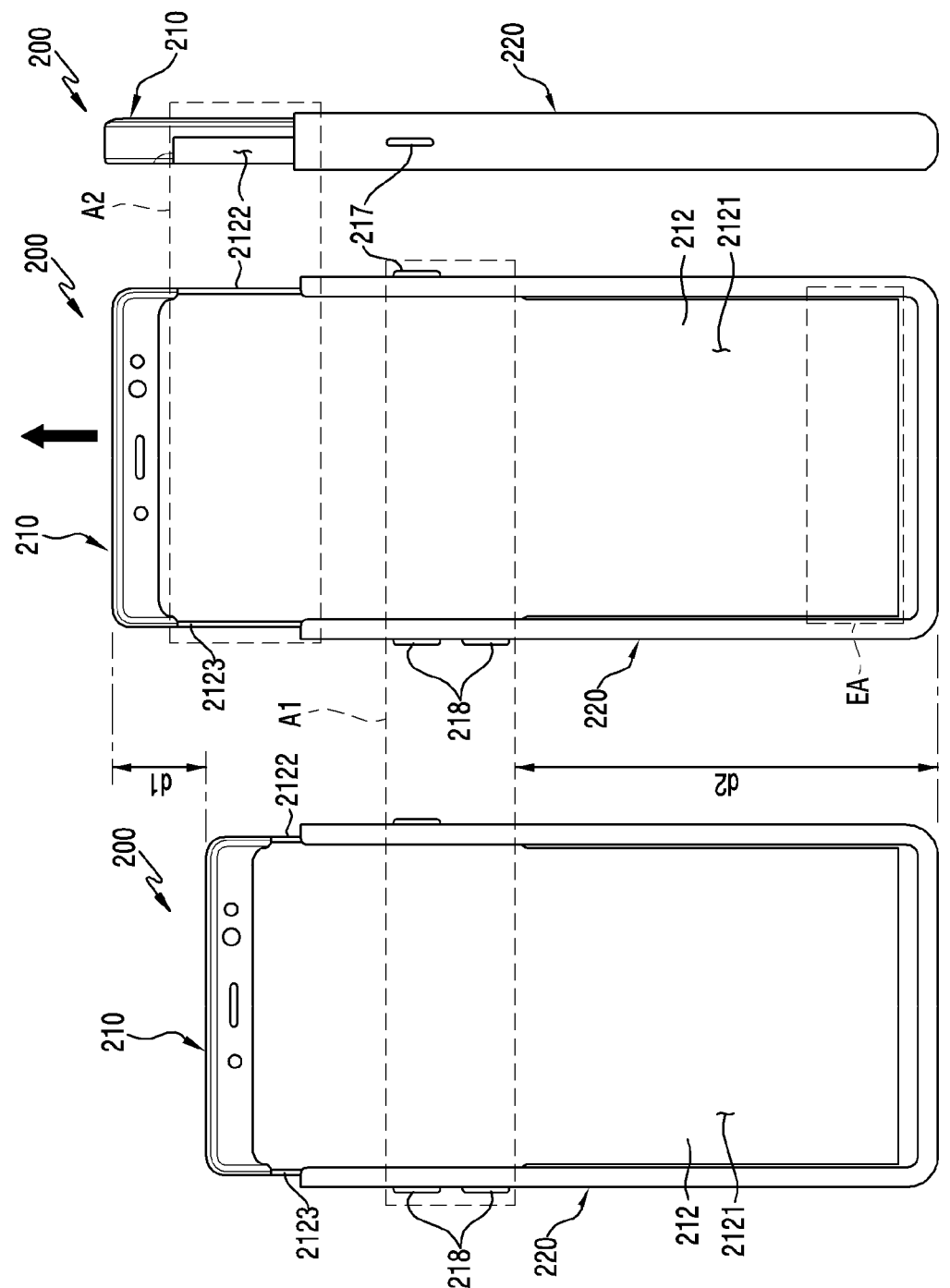
FIG. 3 is a diagram illustrating a change relation of a display area of a display according to opening and closing of an electronic device according to various embodiments of the present invention.

FIG. 3 is a diagram illustrating a change relation of a display area of a display according to opening and closing of an electronic device according to various embodiments of the present invention.

Referring to FIG. 3, the electronic device 200 may operate with the first structure 210 closed or opened with respect to the second structure 220. According to an embodiment, the bent portion 2122 of the display 212 may be disposed with its part exposed through the side surface 2113 of the first plate 211 even in the closed state. According to an embodiment, the bent portion 2122 may be configured to provide a display area associated with the flat portion 2121 of the display 212 or a separate display area.

According to various embodiments, even if the first structure 210 is opened with respect to the second structure 220 at the specific movement distance dl, a key button arrangement area A1 does not change, and may be disposed at a specific position. For example, the key button 217 may be disposed on the second structure 220. According to an embodiment, if the first structure 210 is completely opened, the display area of the display 212 may be extended by the extended area EA, and the bent portion 2122 may be exposed to outside by an exposed area A2.

Figure 4A:
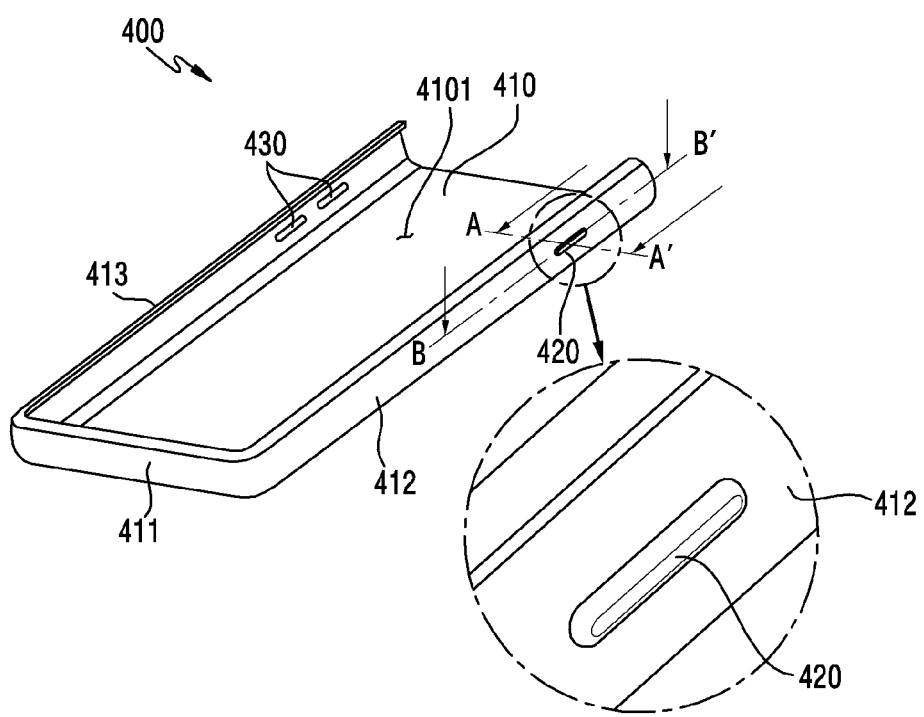
FIG. 4A is a diagram illustrating a configuration of a second structure of an electronic device according to various embodiments of the present invention.
Figure 4B:
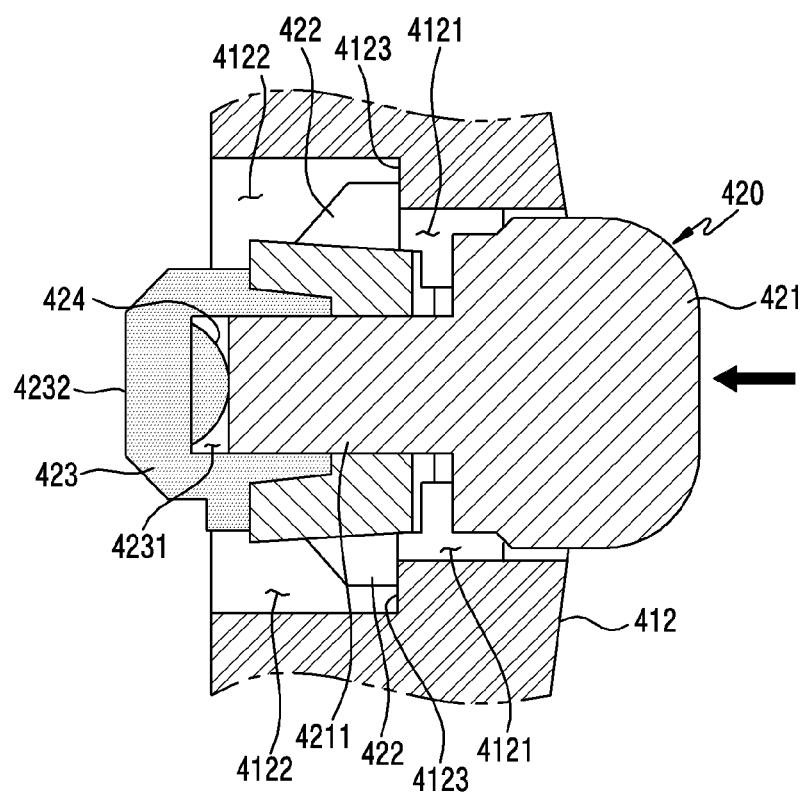
FIG. 4B and FIG. 4C are cross-sectional views of main parts illustrating an arrangement structure of a key button included in the second structure of FIG. 4A according to various embodiments of the present invention.
Figure 4C:
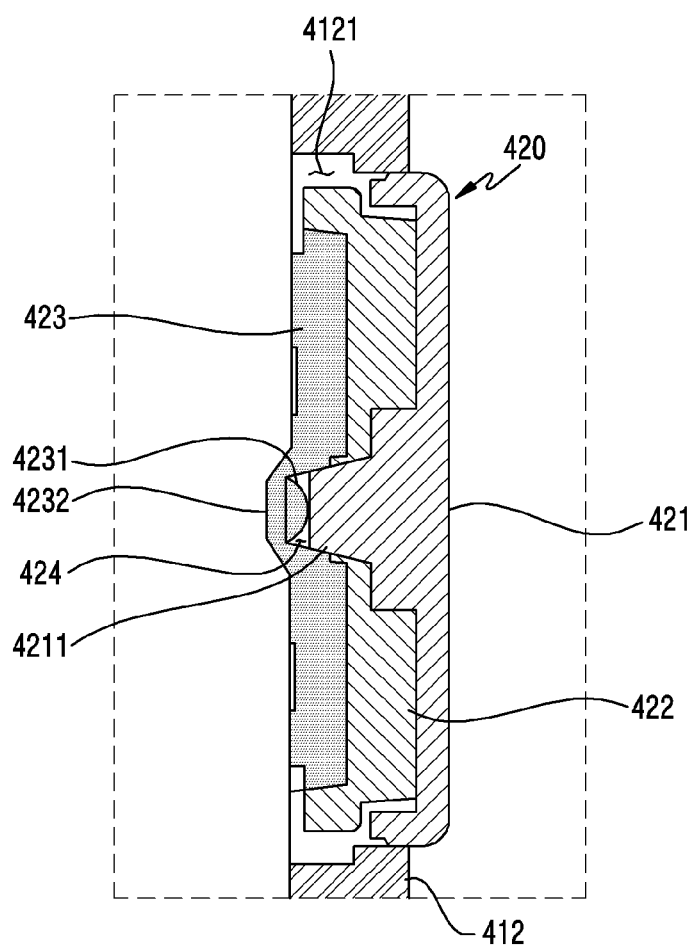

FIG. 4A is a diagram illustrating a configuration of a second structure of an electronic device according to various embodiments of the present invention. FIG. 4B and FIG. 4C are cross-sectional views of main parts illustrating an arrangement structure of a key button included in the second structure of FIG. 4A according to various embodiments of the present invention.

A second structure 400 of FIG. 4A through FIG. 4C may be similar at least in part to the second structure 220 of FIG. 2A or include other embodiments of the second structure.

Referring to FIG. 4A, the second structure 400 may include a second plate 410, a first side wall 411 formed along a lower edge in a direction perpendicular to the second plate 410, a second side wall 412 extending from one end of the first side wall 411 and formed in a direction perpendicular to the first side wall 411 and the second plate 410 and a third side wall 413 extending from the other end of the first side wall 411 and formed in parallel with the second side wall 412. According to an embodiment, a space surrounded by the second plate 410, the first side wall 411, the second side wall 412, and the third side wall 413 may be applied as an arrangement space where at least part of a first structure (e.g., the first structure 510 of FIG. 5A) is movably disposed. According to an embodiment, the second side wall 412 may include a first key button 420 disposed to expose or protrude its part outward. According to an embodiment, the third side wall 413 may include a second key button 430 disposed to expose or protrude its part outward. According to an embodiment, the first key button 420 may serve as a power button, and the second key button 430 may serve as a volume control button.

According to an embodiment of the present invention, while the arrangement structure of the first key button 420 is described by way of example, it is obvious that an arrangement structure of the second key button 430 may also be applied in the same manner.

FIG. 4B is the cross-sectional view taken along the line A-A' of FIG. 4A, and FIG. 4C is the cross-sectional view taken along the line B-B' of FIG. 4A.

Referring to FIG. 4B and FIG. 4C, the key button 420 may be disposed to be penetrated through holes 4121 and 4122 formed in the second side wall 412 of the second structure 400. According to an embodiment, the through holes 4121 and 4122 may include a first through hole 4121 having a first through volume, and a second through hole 4122 extending from the first through hole 4121 and having a second through volume which is greater than the first through volume. According to an embodiment, a step portion 4123 may be formed between the first through hole 4121 and the second through hole 4122 due to the difference of the through volume. According to an embodiment, the key button 420 may be disposed to, for example, match or protrude more from the outer surface of the second side wall 412. According to an embodiment, the key button 420 may be fixed in a manner that a key top 421 exposed from the outer surface of the second side wall 412 and a projection 4211 extending from the key top 421 penetrate. The projection 4211 of the key button 420 may be coupled with a locking portion 422 which blocks the key top 421 from escaping to the outside of the second side wall 412 inside the first through hole 4121. The key button 420 may include a contact portion 423 of which at least partial area protrudes to the inner surface of the second side wall 412. According to an embodiment, the protrusion 4211 may be disposed to be rotatably received on a recess 4231 formed in the contact portion 423 by penetrating through the locking portion 422. According to an embodiment, the locking portion 422 is engaged with the step portion 4123 formed between the first through hole 4121 and the second through hole 4122 to thus prevent the key button 420 from escaping the second side wall 412. According to an embodiment, the key top 421 may be disposed to pass through the first through hole 4121 and to move along the first through hole 4121. According to an embodiment, a dome key 424 which may be pressed (e.g., pushed) by an end portion of the projection 4211 may be disposed in the recess 4231. According to an embodiment, the dome key 424 may include a metal dome. According to an embodiment, the dome key 424 may provide feeling of crimp to the user, if the key top 421 is pressed. According to an embodiment, the contact portion 423 may include a contact surface 4232. For example, if the second structure 400 is coupled with the first structure (e.g., the first structure 210 of FIG. 3), the contact surface 4232 may contact a bent portion (e.g., the bent portion 2122 of FIG. 3) of a display (e.g., the display 212 of FIG. 3) disposed in the first structure. According to an embodiment, if the display is implemented with a capacitive touch screen, the contact portion 423 may be formed of a conductive material, to promote detection using a change value of capacitance. Although not depicted, a spring may be interposed between the locking portion 422 and the stepped portion formed inside the first through hole 4121 formed in the second side wall 412 so as to restore the pressurized key top to its original position.

Figure 5A:
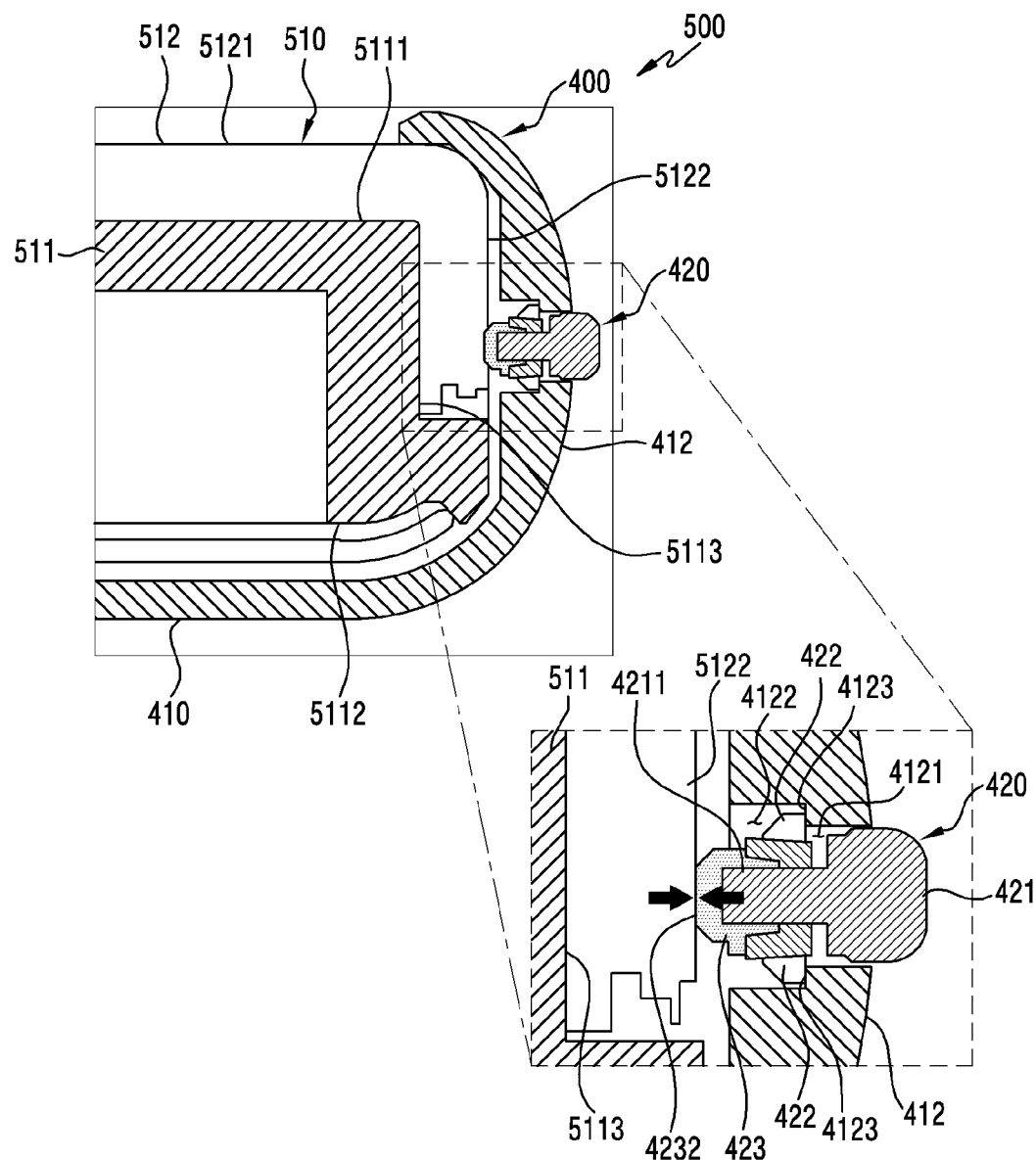
FIG. 5A and FIG. 5B are cross-sectional views of main parts of an electronic device illustrating a detection structure according to manipulation of a key button according to various embodiments of the present invention.
Figure 5B:
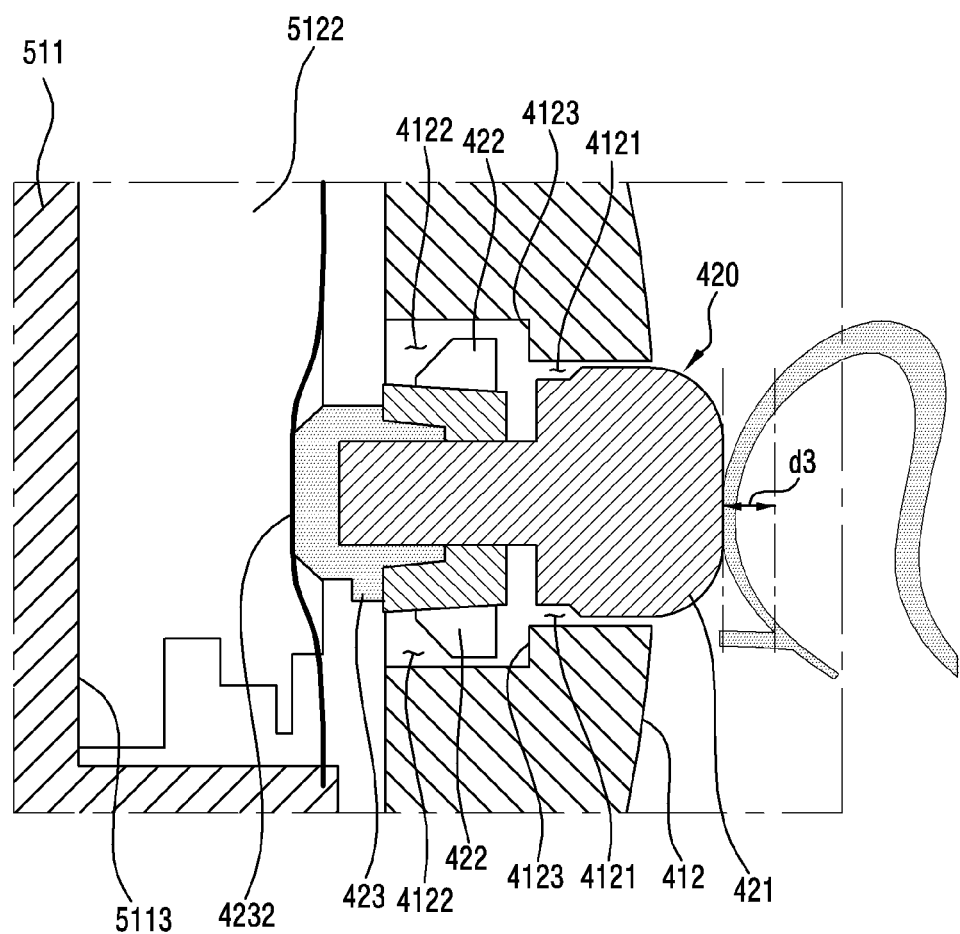
Figure 5C:
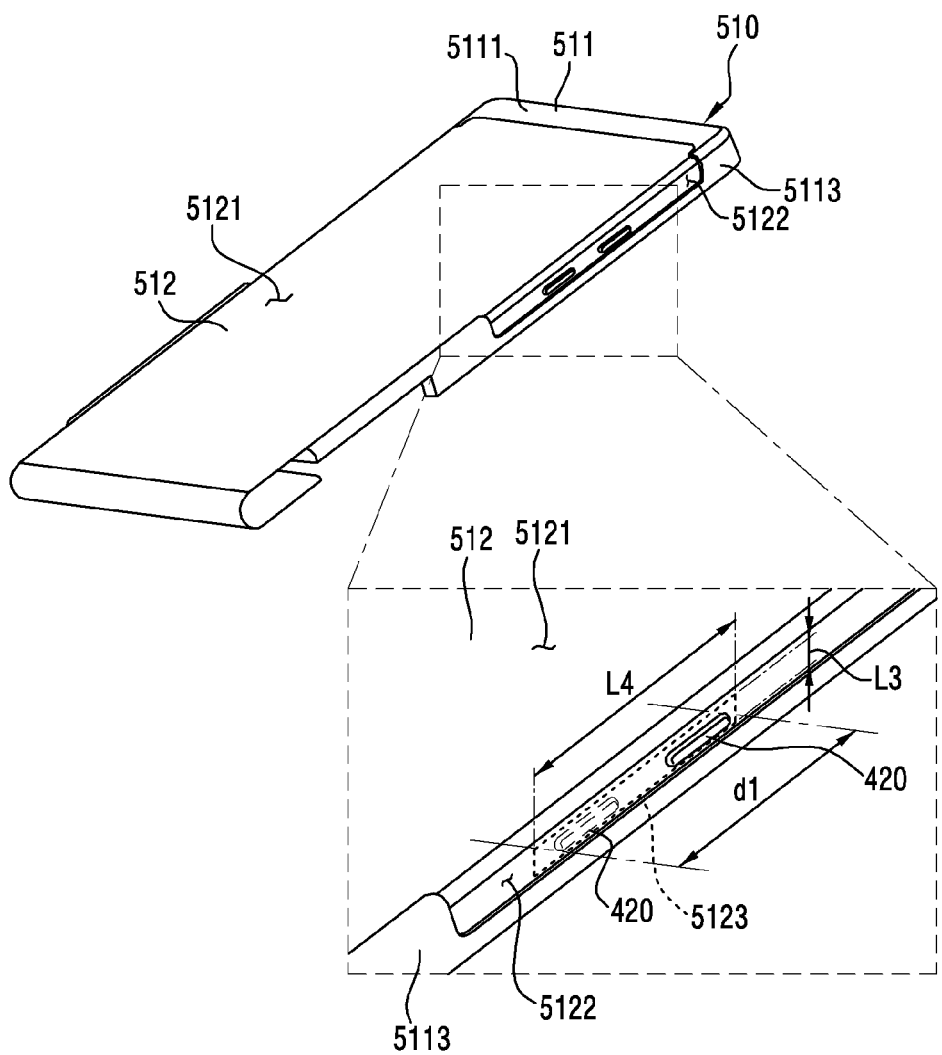
FIG. 5C is a diagram illustrating a positional relation of the key button according to movement of a first structure according to various embodiments of the present invention.

FIG. 5A and FIG. 5B are cross-sectional views of main parts of an electronic device illustrating a detection structure according to manipulation of a key button according to various embodiments of the present invention. FIG. 5C is the diagram illustrating a positional relation of the key button according to movement of a first structure according to various embodiments of the present invention. FIG. 5A through FIG. 5C illustrate an electronic device 500 to which the second structure 400 of FIG. 4A through FIG. 4C is applied.

The electronic device 500 of FIG. 5A may be similar at least in part to the electronic device 101 of FIG. 1 or the electronic device 200 of FIG. 2A, or may include other embodiments of the electronic device.

Referring to FIG. 5A and FIG. 5B, the electronic device 500 may include a first structure 510 including a first plate 511 and a second structure 400 including a second plate 410 disposed to move with respect to the first structure 510. According to an embodiment, the first plate 511 may include a first surface 5111 and a second surface 5112 facing away from the first surface 5111 and a side surface 5113 disposed between the first surface 5111 and the second surface 5112. According to an embodiment, the second structure 400 may include a first side wall (e.g., the first side wall 411 of FIG. 4A), a second side wall 412 extending from one end of the first side wall and a third side wall (e.g., the third side wall 413 of FIG. 4A) extending from the other end of the first side wall.

According to various embodiments, the electronic device 500 may include a display 512. According to an embodiment, the display 512 may include a display module, a touch sensor, a pressure sensor and/or a transparent cover. According to an embodiment, the display 512 may include a flat portion 5121 disposed on the first surface 5111 of the first plate 511, and a bent portion 5122 extending from the flat portion 5121 and expanding to at least partial area of the side surface 5113. According to an embodiment, a key button 420 may be disposed to penetrate the second side wall 412 of the second plate 410. According to an embodiment, the key button 420 may be disposed to press towards the side surface 5113. According to an embodiment, the key button 420 is disposed to be blocked by the second side wall 412, and if pressed, may be disposed such that a contact surface (e.g., the contact surface 423 of FIG. 4B) of a contact portion (e.g., the contact portion 4232 of FIG. 4B) protruding inwards of the second side wall 412 may contact the bent portion 5122 of the display 512.

According to various embodiments, as the contact portion 423 is pressed with a particular pressing amount d3, the key button 420 may affect the bent portion 5122 of the display 512. For example, if the display 512 includes a touch sensitive sensor (e.g., a capacitive touch sensor), the electronic device 500 may detect an input operation (the pressing operation) of the key button 420 based on a change value of the capacitance.

Referring to FIG. 5C, if the first structure 510 performs the opening and closing operation with respect to the second structure 400, the electronic device 500 may detect a movement position of the first structure 510 within the reciprocating distance dl according to the opening and closing operation of the first structure 510, by detecting the change of the capacitance generated by the contact surface 4232 of the contact portion 423 included in the key button 420 which contacts the bent portion 5122 of the display 512. According to an embodiment, at least partial area 5123 of the bent portion 5202 (e.g., a sensing circuit) of the display 512 may have a first length L3 in a height direction of the side surface 5113, and have a second length L4 greater than the first length L3 in a longitudinal direction of the side surface 5113.

FIG. 6A through FIG. 6D are diagrams illustrating a configuration of a display according to various embodiments of the present invention.

A display 600 of FIG. 6A through FIG. 6D may be similar at least in part to the display 212 of FIG. 2A or the display 512 of FIG. 5A, or may include other embodiments of the display.

Figure 6A:
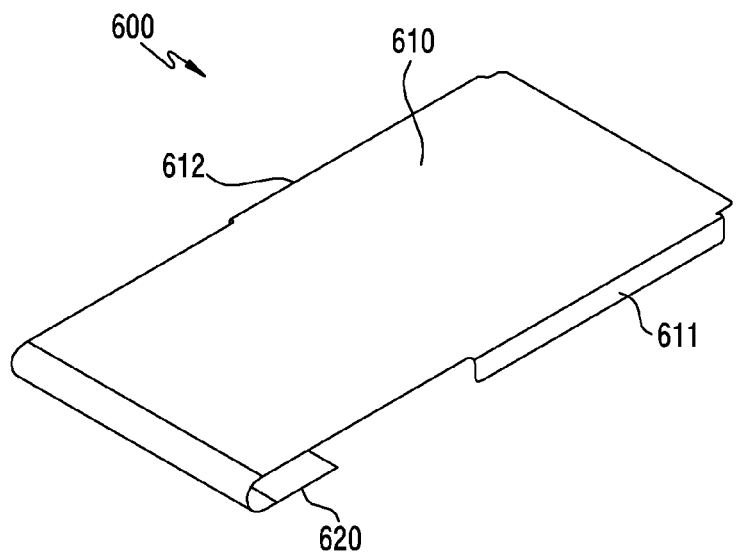
FIG. 6A through FIG. 6D are diagrams illustrating a configuration of a display according to various embodiments of the present invention.
Figure 6B:
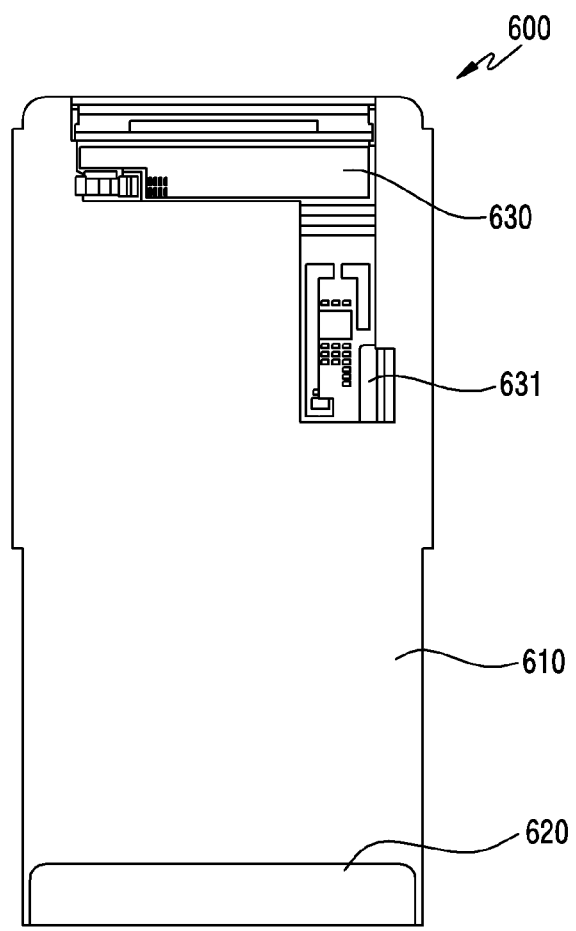

Referring to FIG. 6A and FIG. 6B, the display 600 may include a flat portion 610 extending across at least part of a first surface (e.g., the first surface 2111 of FIG. 2A) of a first plate (e.g., the first plate 211 of FIG. 2A), and disposed on the first surface, and a bendable portion 620 extending from the flat portion 610 into a space between a first side wall (e.g., the first side wall 2211 of FIG. 2A) of a second plate (e.g., the second plate 211 of FIG. 2A) with the first structure (e.g., the first structure 210 of FIG. 2A) closed. According to an embodiment, the display 600 may include bent portions 611 and 612 extending from the flat portion 610 to a side surface (e.g., the side surface 2113 of FIG. 2A) of the first plate (e.g., the first plate 211 of FIG. 2A). According to an embodiment, the display 600 may include a circuit portion 630 disposed to control a display area of a display at an end portion of the bendable portion 620 and a connector 631 disposed for electrical connection with a printed circuit board (PCB) (e.g., a PCB 712 of FIG. 7A) disposed inside the electronic device at an end portion of the circuit portion 630. According to an embodiment, a touch sensor of the display 600 may be formed in the flat portion 620 and the bent portions 611 and 612. For example, the touch sensor of the display 600 may be formed in an electrode pattern of the same type on the flat portion 620 and the bent portions 611 and 612. According to an embodiment, based on the structure of the electronic device (e.g., the electronic device 101 of FIG. 1) or the structure of the display 600, part of the bent portions 611 and 612 may be omitted.

Figure 6C:
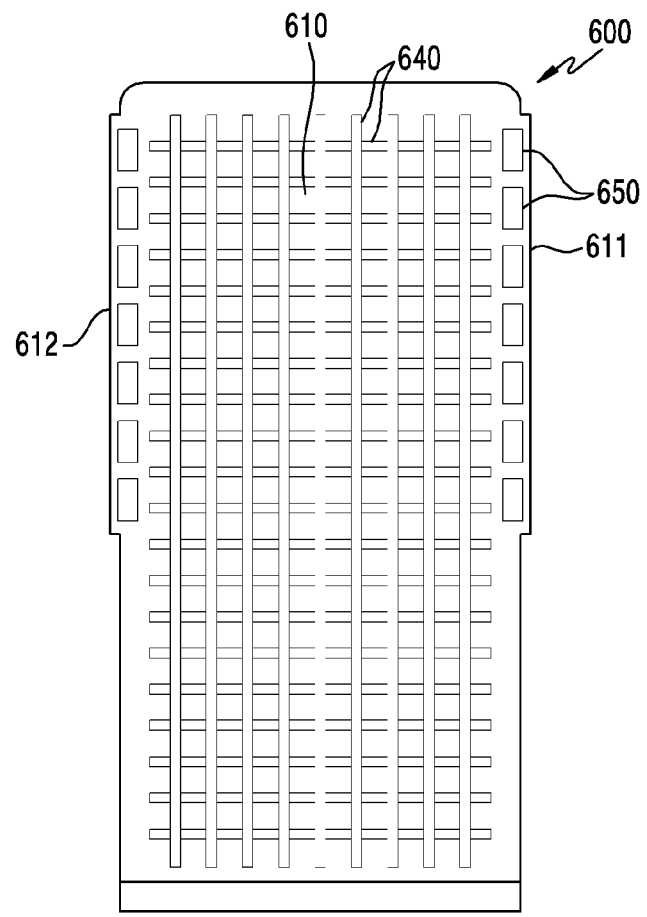

Referring to FIG. 6C, the display 600 may include the touch sensor, and a touch pattern may be disposed in a different form on the flat portion 610 and the bent portions 611 and 612. For example, the flat portion 610 may be disposed with a mutual electrode pattern 640, and the bent portions 611 and 612 may be disposed with a self-dot pattern 650. According to an embodiment, sensing sensitivity of the self-dot pattern 650 may be set to be higher than sensing sensitivity of the mutual pattern 640 during at least partial time.

Figure 6D:
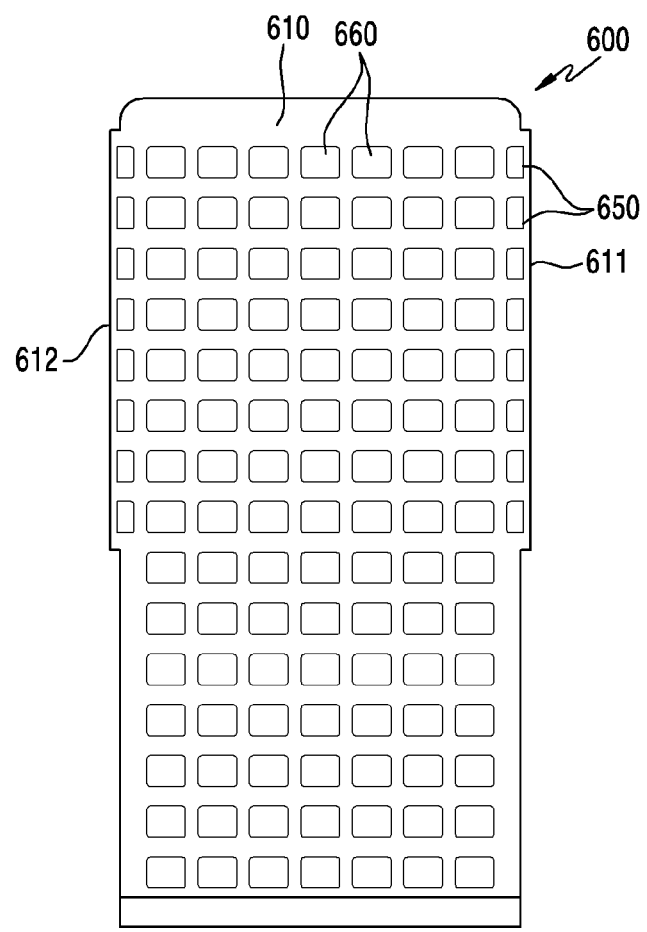

Referring to FIG. 6D, the touch sensor of the display 600 may be included, and a touch pattern may be disposed in the same or different form on the flat portion 610 and the bent portions 611 and 612. For example, the flat portion 610 may be disposed with a first self-dot pattern 660, and the curved portions 611 and 612 may be disposed with a second self-dot pattern 650. According to an embodiment, at least one of resolution, size, or sensitivity of the first self-dot pattern 660 may be configured to be different (e.g., high resolution, small size, high sensitivity) from at least one of resolution, size, or sensitivity of the second self-dot pattern 650.

Figure 7A:
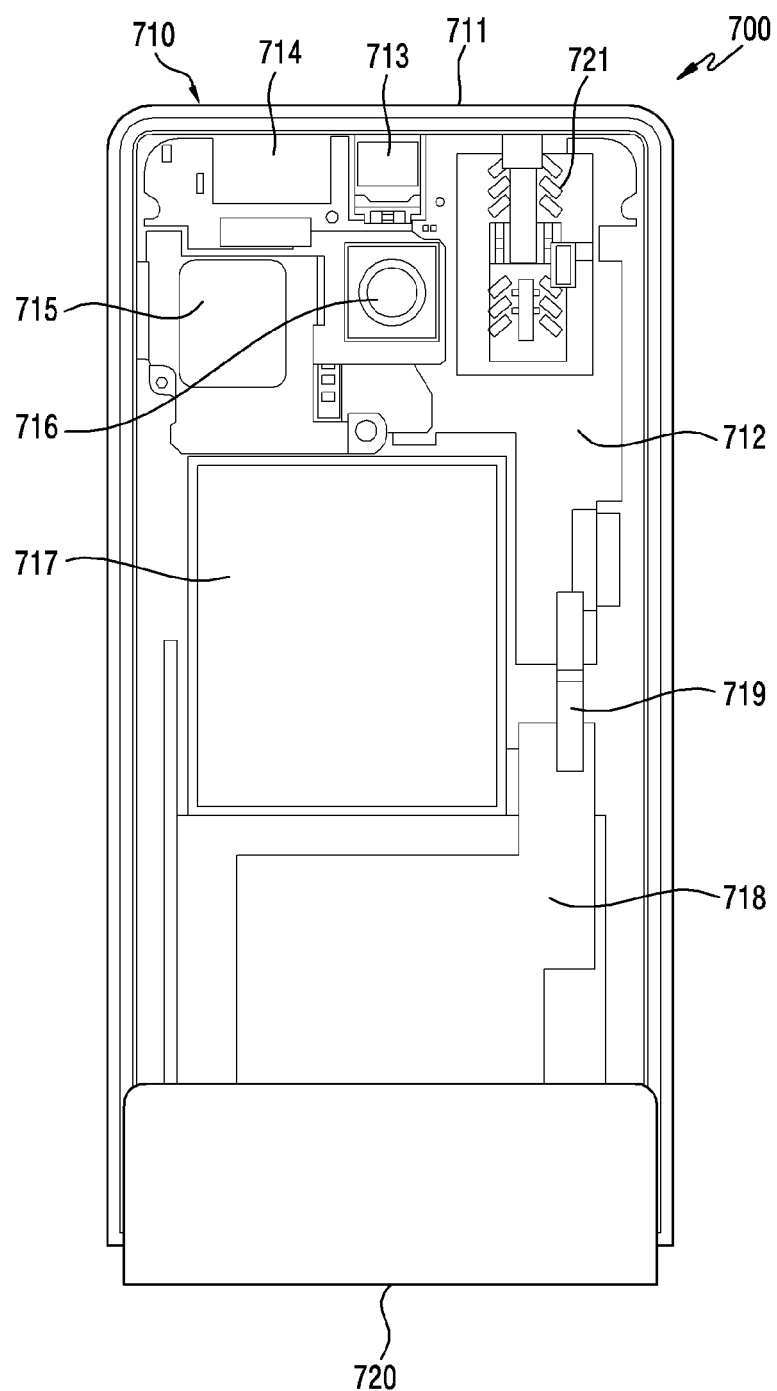
FIG. 7A and FIG. 7B are diagrams illustrating a configuration of a first structure of an electronic device according to various embodiments of the present invention.
Figure 7B:
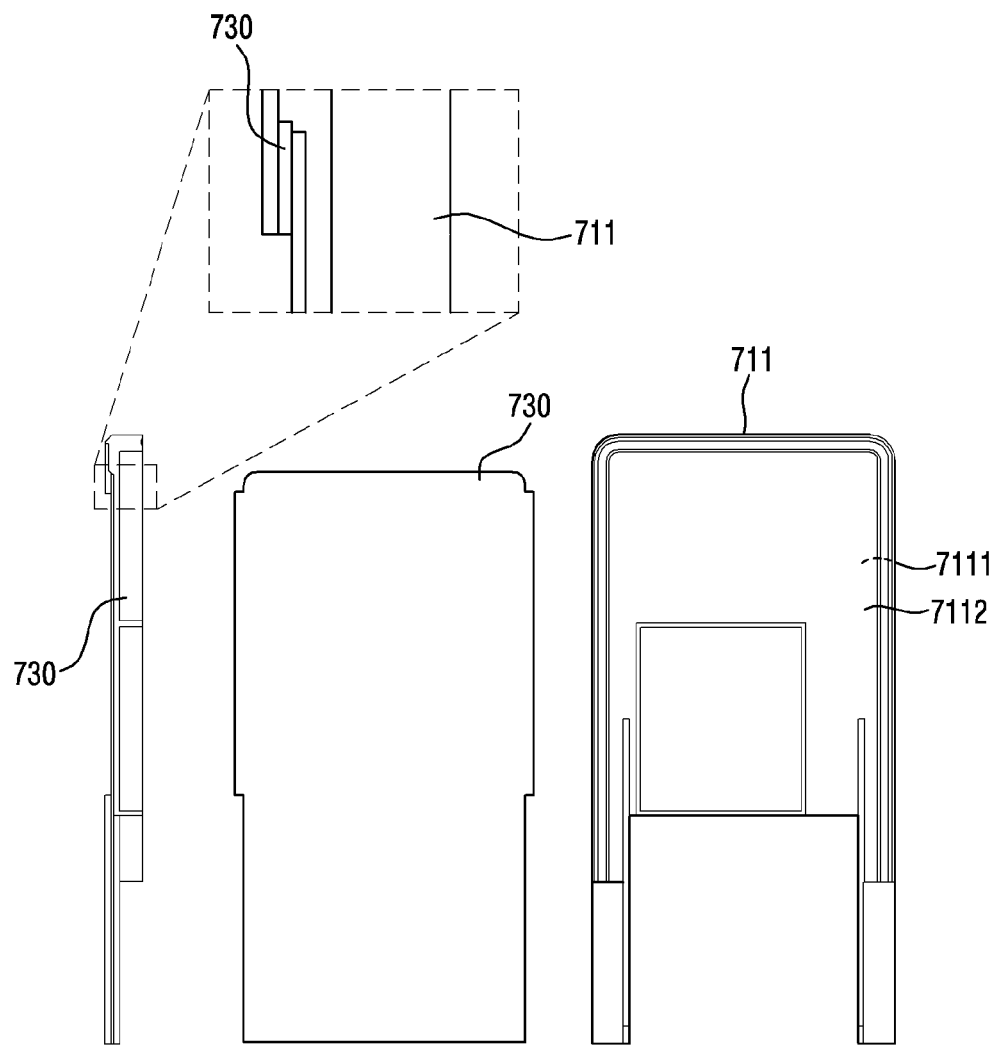

FIG. 7A and FIG. 7B are diagrams illustrating a configuration of a first structure of an electronic device according to various embodiments of the present invention.

An electronic device 700 of FIG. 7A may be similar at least in part to the electronic device 101 of FIG. 1, the electronic device 200 of FIG. 2A or the electronic device 500 of FIG. 5A, or may include other embodiments of the electronic device.

FIG. 7A is the diagram illustrating a configuration of a rear surface of the electronic device 700 from which a second structure (e.g., the second structure 220 of FIG. 2A) is removed, and the electronic device 700 may include a plurality of electronic components disposed between a first plate 711 of the first structure 710 and the second structure (e.g., the second structure 220 of FIG. 2A). According to an embodiment, the electronic components may include a PCB 712, a camera module 716, a receiver 713, a speaker 715, a card-type external device mounting socket 721 or an image camera module 714.

According to various embodiments, the electronic device 700 may include a sub PCB 718 disposed to move together with the second structure (e.g., the second structure 220 of FIG. 2A) separately from the PCB 712 disposed on the first structure 710. According to an embodiment, the sub PCB 718 may be used as a medium for electrically connecting electronic components (e.g., an antenna module, etc.) which may be disposed on the second structure (e.g., the second structure 220 of FIG. 2A) with the PCB 712. According to an embodiment, the PCB 712 and the sub PCB 718 may be changed in spacing therebetween according to the opening and closing operation of the first structure 710. According to an embodiment, the electronic device 700 may include an electrical connection member 719 disposed to electrically connect the PCB 712 and the sub PCB 718. According to an embodiment, the electrical connection member 719 may be formed of a material having high flexibility to receive the reciprocating distance of the first structure 710. According to an embodiment, the electrical connection member 719 may include a flexible printed circuit board (FPCB).

Referring to FIG. 7B, the first plate 711 may include a first surface 7111 and a second surface 7112 facing away from the first surface 7111. According to an embodiment, a support member 730 may be disposed substantially throughout the first surface 7111 in the first plate 711. According to an embodiment, the support member 730 may be fixed to the first plate 711 using bonding, taping or screw fastening.

According to an embodiment, the support member 730 may protect a plurality of electronic components disposed between the first plate 711 and the second structure (e.g., the second structure 220 of FIG. 2A), and make a mounting space of a display (e.g., the display 121 of FIG. 2A). According to an embodiment, the display may be attached to one surface of the support member 730 through bonding or taping.

Figure 8:
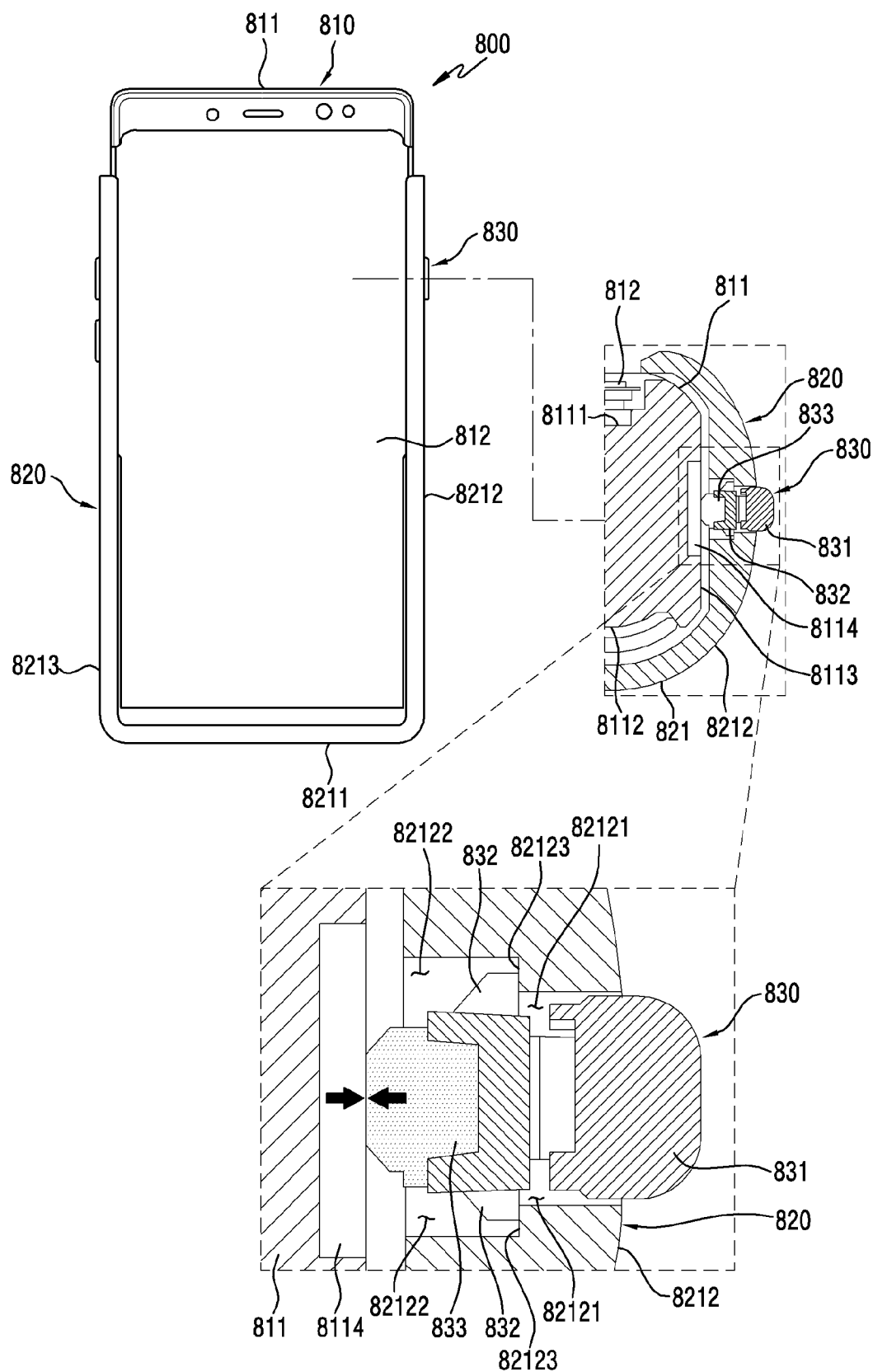
FIG. 8 is a cross-sectional view of main parts of an electronic device illustrating a key button arrangement structure according to various embodiments of the present invention.

FIG. 8 is a cross-sectional view of main parts of an electronic device illustrating a key button arrangement structure according to various embodiments of the present invention.

An electronic device 800 of FIG. 8 is similar at least in part to the electronic device 101 of FIG. 1, the electronic device 200 of FIG. 2A, the electronic device 500 of FIG. 5A or the electronic device 700 of FIG. 7A, or may include other embodiments of the electronic device.

Referring to FIG. 8, the electronic device 800 may include a first structure 810 including a first plate 811 and a second structure 820 including a second plate 821 which is disposed to move with respect to the first structure 810. According to an embodiment, the first structure 810 may include a first surface 8111, a second surface 8112 facing away from the first surface 8111, and a side surface 8113 disposed between the first surface 8111 and the second surface 8112. According to an embodiment, the second structure 820 may include a first side wall 8211, a second side wall 8212 extending from one end of the first side wall 8211, and a third side wall 8213 extending from the other end of the first side wall 8211.

According to various embodiments, the electronic device 800 may include a display 812. According to an embodiment, the display 812 may be disposed on the first surface 8111 of the first plate 811. According to an embodiment, a key button 830 may be disposed to penetrate the second side wall 8212 of the second plate 821.

According to various embodiments, the key button 830 may be disposed to penetrate at least in part through holes 82121 and 82122 formed in the second side wall 8212. According to an embodiment, the key button 830 may include a key top 831 disposed to expose or protrude at least part thereof to outside of the second side wall 8212, a locking portion 832 coupled with the top key 831 and preventing escape of the key button 830 inside the through holes 82121 and 82122 and a contact portion 833 coupled to an end portion of the locking portion 832, protruding inwards of the second side wall 8212, and contacting a pressure sensor 8114 disposed in the surface side 8113 of the first structure 810. According to an embodiment, the key button 830 may be disposed to be pressed toward the side surface 8113. According to an embodiment, the through holes 82121 and 82122 may include the first through hole 82121 having a first through volume, and the second through hole 82122 extending from the first through hole 82121 and having a second through volume which is greater than the first through volume. According to an embodiment, a step portion 82123 may be formed between the first through hole 82121 and the second through hole 82122 due to the difference of the through volume. According to an embodiment, the locking portion 832, which is engaged with the step portion 82123, may be prevented from completely separating from the second side wall 8212.

According to various embodiments, as the key button 830 presses the key top 831 exposed to the outside of the second side wall 8212, the contact portion 833 may press the pressure sensor 8114 with a specific pressing force. According to an embodiment, the pressure sensor 8114 may be formed to have a length that the contact portion 833 may always contact during the reciprocating movement according to the opening and closing operation of the first structure 810 in the side surface 8113 of the first structure 810. For example, the electronic device 800 may detect an input according to the pressing of the key button 830 generated during the opening and closing operation of the first structure 810. However, it is not limited thereto, and if the contact portion 833 is configured to have a specific pressure even without being pressed, the electronic device 800 may detect a movement position corresponding to the opening and closing operation of the first structure 810 through the pressure sensor 8114.

Figure 9A:
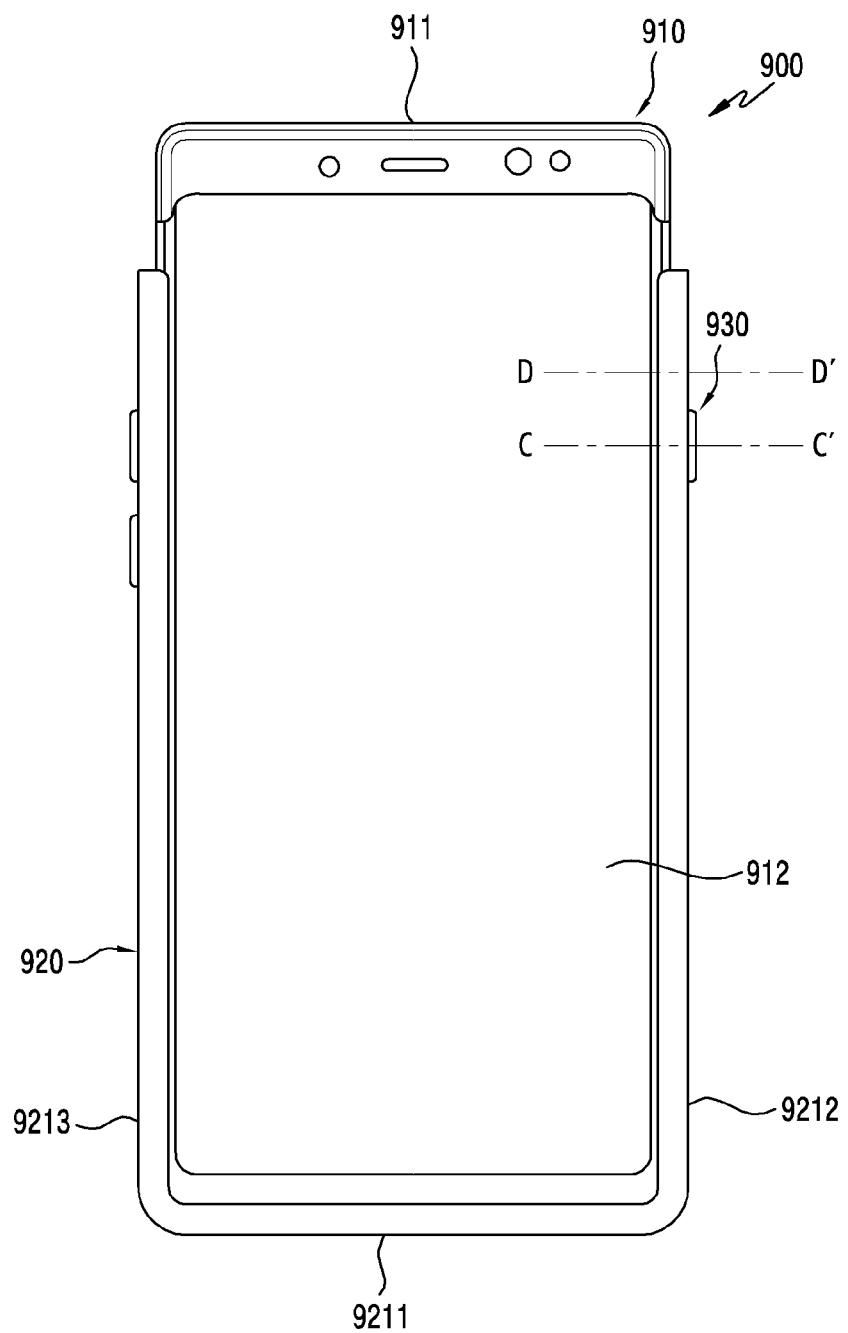
FIG. 9A through FIG. 9E are diagrams illustrating a key button arrangement structure in an electronic device according to various embodiments of the present invention.
Figure 9B:
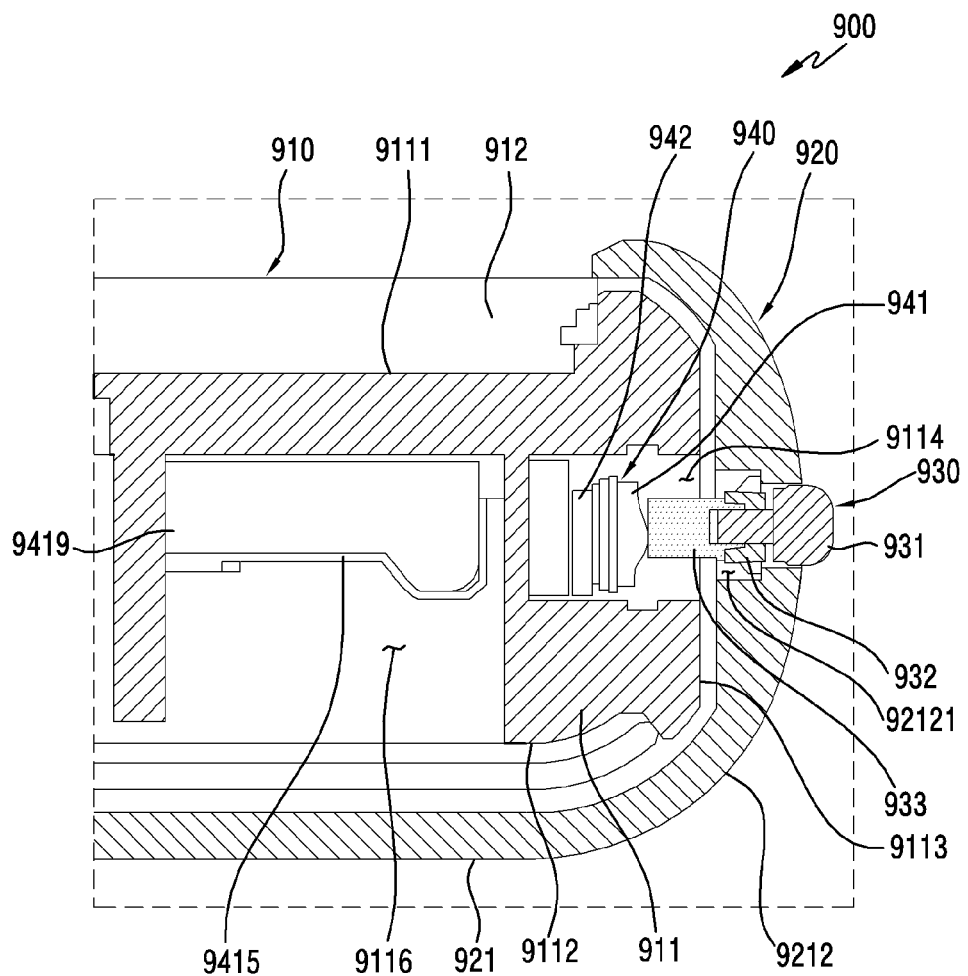
Figure 9C:
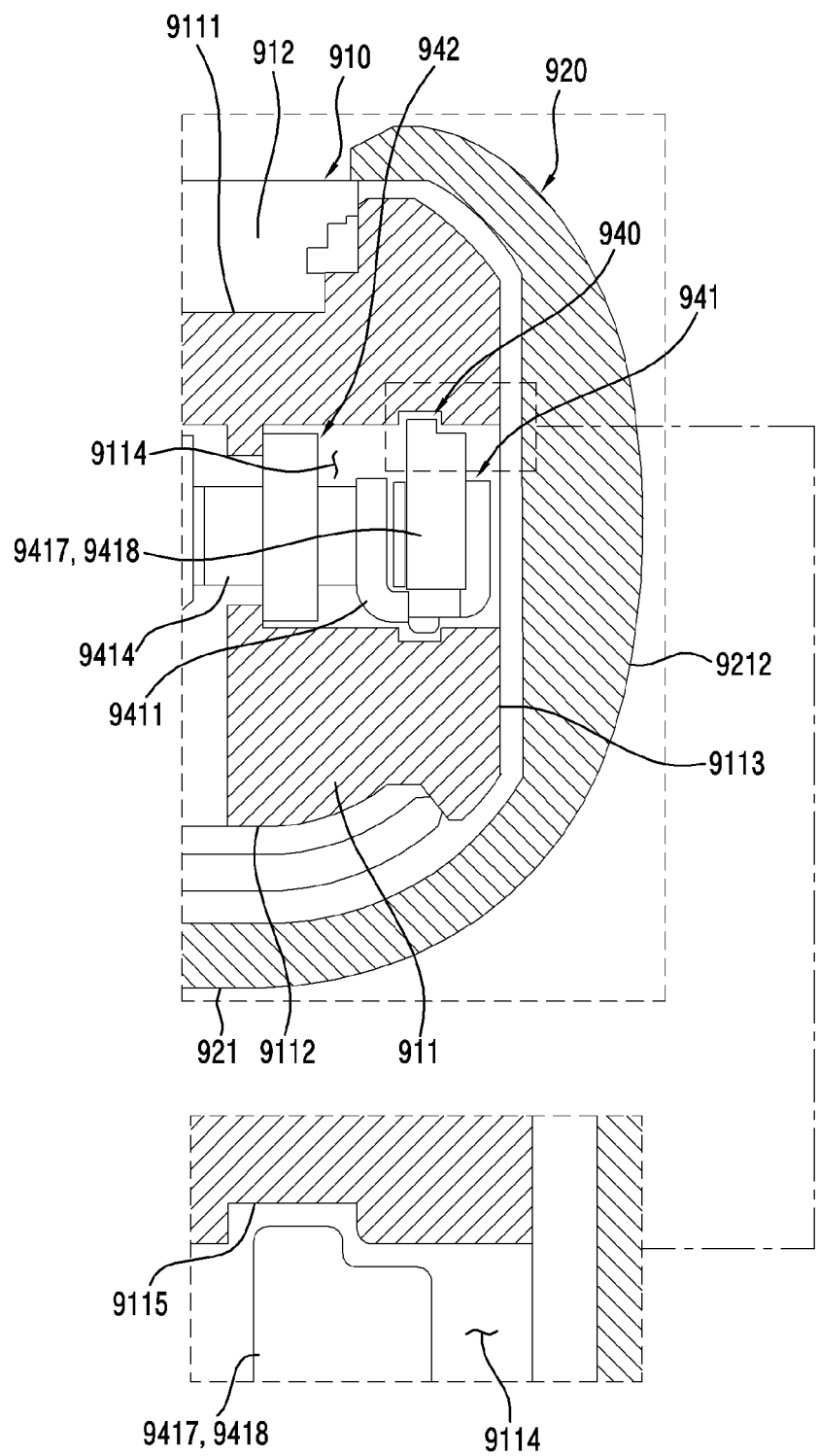

FIG. 9A through FIG. 9E are diagrams illustrating a key button arrangement structure in an electronic device according to various embodiments of the present invention. FIG. 9B is the cross-sectional view taken along a line C-C' of FIG. 9A. FIG. 9C is the cross-sectional view taken along a line D-D' of FIG. 9A.

An electronic device 900 of FIG. 9A may be similar at least in part to the electronic device 101 of FIG. 1 or the electronic device 200 of FIG. 2A, or may include other embodiments of the electronic device.

Referring to FIG. 9A through FIG. 9C, the electronic device 900 may include a first structure 910 including a first plate 911 and a second structure 920 including a second plate 921 disposed to move with respect to the first structure 910. According to an embodiment, the first structure 910 may include a first surface 9111, a second surface 9112 facing away from the first surface 9111 and a side surface 9113 disposed between the first surface 9111 and the second surface 9112. According to an embodiment, the second structure 920 may include a first side wall 9211, a second side wall 9212 extending from one end of the first side wall 9211 and a third side wall 9213 extending from the other end of the first side wall 9211.

According to various embodiments, the electronic device 900 may include a display 912. According to an embodiment, the display 912 may be disposed on the first surface 9111 of the first plate 911. According to an embodiment, a key button 930 may be disposed by penetrating the second side wall 9212 of the second plate 921.

According to various embodiments, the key button 930 may be disposed by penetrate at least in part the through hole 92121 formed in the second side wall 9212. According to an embodiment, the key button 930 may include a key top 931 disposed to expose or protrude at least in part outside the second side wall 9212, a locking portion 932 coupled to the key top 931 and preventing escape of the key button 930 inside the through hole 92121 and a contact portion 933 coupled to an end portion of the locking portion 932, protruding inwards of the second side wall 9212 (toward the side surface 9113), and fixed to at least part of a detection module 940 disposed in the surface side 9113 of the first structure 910. According to an embodiment, the key button 930 may be disposed to be pressed toward the side surface 9113.

According to various embodiments, the first structure 910 may include the detection module 940 disposed in a space 9114 recessed from the side surface 9113. According to an embodiment, the detection module 940 may include a movement module 942 which moves together according to the opening and closing operation of the first structure 910 and a fix module 941 disposed to approach or contact the movement module 942 and secured in its position with the key button 930. According to an embodiment, the fix module 941 may fix the contact portion 933 of the key button 930 disposed through the second side wall 9212 and protruding inward to move only in the pressing direction of the key button 930, and recognize the pressing operation of the key button 933. According to an embodiment, the movement module 942 may detect moved position coordinates of the movement module 942 which moves relative to the fix module 941. According to an embodiment, the movement position of the movement module 942 may correspond to the movement position of the first structure 910. According to an embodiment, since the fix module 941 disposed in a space 9114 of the first structure 910 needs to maintain its position together with the key button 930 relatively to the movement module 941 which moves together with the first structure 910, a guide slit 9115 for guiding at least part (e.g., guide protrusions 9417 and 9418 of FIG. 9D) of the fix module 941 in the space 9114 of the first structure 910. For example, if the first structure 910 moves according to the opening and closing operation, part of the fix module 941 may be continuously fixed in position by the guide slit 9115 of the first structure 910. According to an embodiment, an electrical connection member 9414 (e.g., an FPCB) having flexibility may be connected to an end portion of the fix module 941, and a connector 9415 of an end portion may be secured to be bypassed to an inner space 9116 of the first structure 910 and supported by a bracket 9419.

According to various embodiments, the key button 930 may be disposed such that the contact portion 933 presses the fix module with a specific pressing force as the key top 931 exposed to the outside of the second side wall 9212 is pressed.

Figure 9D:
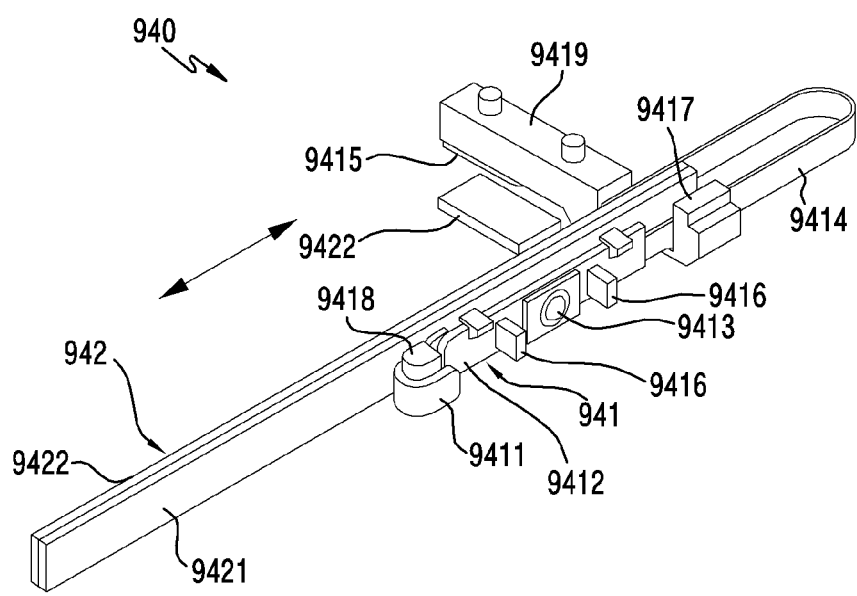

FIG. 9D is a perspective view illustrating the configuration of the detection module according to various embodiments of the present invention.

Referring to FIG. 9D, the detection module 940 may include the movement module 942 fixed to and moving together with the first structure 910 and the fix module 941 fixed in position relatively to the first structure 910. According to an embodiment, the fix module 941 may be coupled with the contact portion 933 of the key button 930 installed through the second side wall 9212 of the second structure 920.

According to various embodiments, the movement module 942 may include a coordinate recognition circuit 9421 formed in a length corresponding to the reciprocating distance of the first structure 910 at least according to the opening and closing of the first structure 910, and a coordinate recognition connector 9422 drawn out from an end portion of the coordinate recognition circuit 9412 to the inner space (e.g., the inner space 9114 of FIG. 9B) of the first structure 910. According to an embodiment, the coordinate recognition connector 9422 is electrically connected to a PCB disposed in the inner space 9114 of the electronic device 900, and thus may provide a processor with position coordinate information of the recognized fix module 941.

According to various embodiments, the fix module 941 may include a printed circuit board 9412 including a dome key 9413, and a support member 9411 for securing the printed circuit board 9412. According to an embodiment, the support member 9411 may be formed of a metal material which responds to magnetic force. According to an embodiment, at least one guide protrusion 9417 and 9418 which may be received on the guide slit 9115 formed in the space 9114 of the first structure 910 may be formed on the support member 9401. According to an embodiment, since the guide protrusions 9417 and 9418 are received on the guide slit 9115, the fix module 941 may induce to maintain its position, if the first structure 910 is moved. According to an embodiment, an FPCB 9414 of a specific length to which a pressure recognition connector 9415 is connected with the end portion may be drawn from the printed circuit board 9412. According to an embodiment, the FPCB 9414 may be bypassed to a rear surface of the coordinate recognition circuit 9421 and electrically connected to a PCB disposed in the inner space of the first structure 910. According to an embodiment, the FPCB 9414 may be formed in a shape or of a material having sufficient flexibility to accommodate the reciprocating distance of the first structure 910. According to an embodiment, the support member 9401 may include a key button support portion 9416 protruding toward the key button on both sides based on the dome key 9413. According to an embodiment, the key button support portion 9416 may prevent the key button 930 from moving in other direction than the pressing direction.

According to various embodiments, a slide magnet 9423 having substantially the same length may be disposed on the rear surface of the coordinate recognition circuit 9421. According to an embodiment, the slide magnet 9423 if of a plate type, and may be attached to the coordinate recognition circuit by bonding or taping. For example, by the magnetic force of the slide magnet 9423, the support member 9411 is in surface contact with the coordinate recognition circuit 9421, thus preventing coordinate recognition error of the movement module 942 which may occur as moving apart from the fix module 941.

According to various embodiments, if the first structure 910 performs the opening and closing operation with respect to the second structure 920, the movement module 942 may be moved relatively to the fix module 941. For example, the coordinate recognition circuit 9421 of the movement module 942 may detect the position of the fix module 941 through a specific sensing value (e.g., a change in capacitance), and coordinate detection information may be provided to a processor of the electronic device 900. According to an embodiment, if the first structure 910 is moving or opened or closed, although the key button 930 is pressed, the dome key of the fix module 941 is pressed, and thus pressing information may be provided to the processor through the printed circuit board 9412 and the FPCB 9414.

Figure 9E:
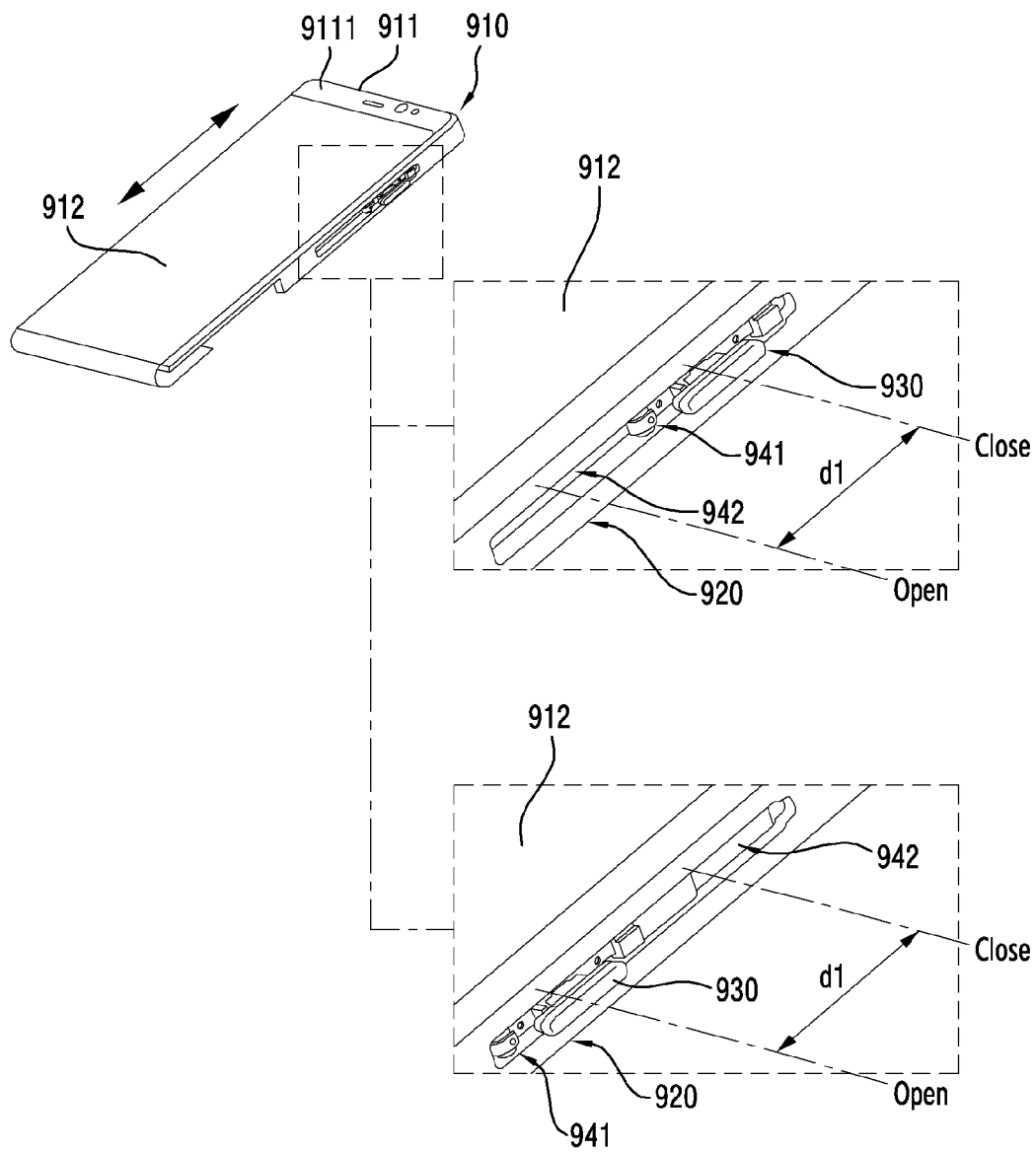

Referring to FIG. 9E, the movement module 942 which moves the specific reciprocating distance dl together with the first structure 910 may detect the position coordinates through the fix module 942 of which the position is maintained together with key button 930 according to the opening and closing operation of the electronic device 900. For example, the electronic device 900 may determine an opening and closing degree of the electronic device 900 using the detected position coordinates.

According to various embodiments, an electronic device (e.g., the electronic device 500 of FIG. 5A) may include a first structure (e.g., the first structure 510 of FIG. 5A) including a first plate (e.g., the first plate 511 of FIG. 5A) including a first surface (e.g., the first surface 5111 of FIG. 5A) and a second surface (e.g., the second surface 5112 of FIG. 5A) facing away from the first surface, and at least one side surface (e.g., the side surface 5113 of FIG. 5A), a second structure (e.g., the second structure 400 of FIG. 5A) including a second plate (e.g., the second plate 510 of FIG. 5A) facing the second surface of the first plate; a first side wall (e.g., the first side wall of FIG. 4A) extended to the second plate; a second side wall (e.g., the second side wall 412 of FIG. 4A) extending to the first side wall and the second plate and facing the side surface; and a third side wall (e.g., the third side wall 413 of FIG. 4A) extending to the first side wall and the second plate, parallel to the second side wall and facing the side surface, wherein the second plate, the first side wall, and the second side wall and the third side wall together form a trough (e.g., the trough 4101 of FIG. 4A) with one side opened to receive at least part of the first structure, the first structure is movable between an open state and a closed state with respect to the second structure in a first direction parallel to the second plate and the second side wall, and the first structure is placed at a first distance (e.g., the first distance L1 of FIG. 2A) from the first side wall in the closed state, and placed at a second distance (e.g., the second distance L2 of FIG. 2B) which is greater than the first distance from the first side wall in the open state, at least one mechanical button (e.g., the key button 420 of FIG. 4A) mounted on the second side wall, and moving toward the first structure from outside of the second structure, and a sensing circuit (e.g., the bent portion 5122 of the touch display of FIG. 5A or the sensing circuit area 5123 of FIG. 5C) disposed between the side wall and the second side wall with at least partial area, and configured to detect the movement of the mechanical button.

According to various embodiments, the sensing circuit may be configured to detect a pressure at which the mechanical button is pressed toward the first structure between the closed state and the open state.

According to various embodiments, the at least partial area of the sensing circuit may have a first length in a height direction of the side surface, and have a second length greater than the first length in a longitudinal direction of the side surface.

According to various embodiments, the at least partial area of the sensing circuit may include a pressure sensor.

According to various embodiments, the at least partial area of the sensing circuit may include a touch sensitive sensor.

According to various embodiments, a touch screen display may be further included, and the at least partial area including the touch sensitive sensor may form at least of the touch screen display.

According to various embodiments, an end portion of the mechanical button may be disposed to contact at least part of the touch screen display by the movement.

According to various embodiments, a flexible touch screen display may be further included, the flexible touch screen display may include a flat portion extending across at least part of the first surface, and disposed on the first surface and a bendable portion extending from the flat portion, and positioned from the flat portion into a space between the first side wall and the first structure in the closed state, and if the first structure is switched from the closed state to the open state, at least part of the bendable portion may be configured to form substantially the same plane as the flat portion.

According to various embodiments, a processor may be further included, and the processor may detect a position change of the first structure with respect to the second structure at least based on a signal corresponding to the movement detected using the sensing circuit.

According to various embodiments, the mechanical button may include a key top disposed to be exposed to outside of the second side wall or the third side wall, a locking portion coupled to the key top, and blocking the key button from escaping inside the second side wall or the third side wall, and a contact portion coupled to the locking portion, and disposed to contact the sensing circuit.

According to various embodiments, the contact portion may be formed of a conductive material, if the sensing circuit detects a change of capacitance.

a portable communication device may include a first structure including a first plate including a first surface and a second surface facing away from the first surface, and at least one side surface, a second structure including a second plate facing the second surface of the first plate and at least one side wall extending from the second plate to face at least one side surface, wherein the second plate and the at least one side wall together form a trough with one side opened to receive at least part of the first structure, the first structure is movable between an open state and a closed state with respect to the second structure in a first direction parallel to the at least one side wall, and the first structure is placed at a first distance from the first side wall in the closed state, and placed at a second distance which is greater than the first distance from the first side wall in the open state, at least one mechanical button mounted on the at least one side wall, and moving toward the first structure from outside of the second structure, and a sensing circuit disposed between the side surface and the side wall with at least partial area, and configured to detect the movement of the mechanical button.

According to various embodiments, the at least partial area of the sensing circuit may include a pressure sensor.

According to various embodiments, the at least partial area of the sensing circuit may include a touch sensitive sensor.

According to various embodiments, a touch screen display may be further included, and the at least partial area including the touch sensitive sensor may form at least part of the touch screen display.

According to various embodiments, a flexible touch screen display may be further included, the flexible touch screen display may include a flat portion extending across at least part of the first surface, and disposed on the first surface and a bendable portion extending from the flat portion, and positioned from the flat portion into a space between the first side wall and the first structure in the closed state, and if the first structure is switched from the closed state to the open state, at least part of the bendable portion may be configured to form substantially the same plane as the flat portion.

According to various embodiments, a processor may be further included, and the processor may detect a position change of the first structure with respect to the second structure at least based on a signal corresponding to the movement detected using the sensing circuit.

According to various embodiments, a portable communication device may include a first structure including a first plate including a first surface and a second surface facing away from the first surface, and at least one side surface, a second structure including a second plate facing the second surface of the first plate and at least one side wall extending from the second plate to face the at least one side surface, coupling with the first structure, and disposed to move a specific reciprocating distance with respect to the first structure, at least one mechanical button mounted on the at least one side wall to move toward the first structure from outside of the second structure and a sensing circuit disposed between the side surface and the side wall with at least partial area, and configured to detect the movement of the mechanical button.

According to various embodiments, the at least partial area of the sensing circuit may include a pressure sensor and/or a touch sensitive sensor.

According to various embodiments, a touch screen display may be further included, and the at least partial area including the touch sensitive sensor may form at least part of the touch screen display.

The embodiments of the present invention disclosed in the specification and drawings merely present specific examples to easily explain technical details according to the embodiments of the present invention and to ease the understanding of the embodiments of the present invention, and do not limit the range of the embodiments of the present invention. Therefore, the scope of various embodiments of the present invention should be construed as encompassing all modifications or modified forms derived based on the technical idea of various embodiments of the present invention as well as the disclosed embodiments.

The invention claimed is:

1. An electronic device comprising:
   a first structure comprising a first plate comprising a first surface and a second surface facing away from the first surface, and at least one side surface;
   a second structure comprising a second plate facing the second surface of the first plate; a first side wall extended to the second plate; a second side wall extending to the first side wall and the second plate and facing the side surface; and a third side wall extending to the first side wall and the second plate, parallel to the second side wall and facing the side surface,
   wherein the second plate, the first side wall, and the second side wall and the third side wall together form a trough with one side opened to receive at least part of the first structure,
   wherein the first structure is movable between an open state and a closed state with respect to the second structure in a first direction parallel to the second plate and the second side wall, and the first structure is placed at a first distance from the first side wall in the closed state, and placed at a second distance which is greater than the first distance from the first side wall in the open state;
   at least one mechanical button mounted on the second side wall, and moving toward the first structure from outside of the second structure; and
   a sensing circuit disposed between the at least one side surface and the second side wall with at least a partial area of the sensing circuit between the at least one side surface and the second side wall, and configured to detect a movement of the mechanical button.

2. The electronic device of claim 1, wherein the sensing circuit is configured to detect a pressure at which the mechanical button is pressed toward the first structure between the closed state and the open state.

3. The electronic device of claim 1, wherein the at least partial area of the sensing circuit has a first length in a height direction of the side surface, and has a second length greater than the first length in a longitudinal direction of the side surface.

4. The electronic device of claim 1, wherein the at least partial area of the sensing circuit comprises a pressure sensor.

5. The electronic device of claim 1, wherein the at least partial area of the sensing circuit comprises a touch sensitive sensor.

6. The electronic device of claim 5, further comprising a touch screen display, and the at least partial area comprising the touch sensitive sensor forms at least of the touch screen display.

7. The electronic device of claim 6, wherein an end portion of the mechanical button is disposed to contact at least part of the touch screen display by the movement.

8. The electronic device of claim 1, further comprising a flexible touch screen display, wherein the flexible touch screen display comprises,
   a flat portion extending across at least part of the first surface, and disposed on the first surface; and
   a bendable portion extending from the flat portion, and positioned from the flat portion into a space between the first side wall and the first structure in the closed state,
   wherein if the first structure is switched from the closed state to the open state, at least part of the bendable portion is configured to form substantially the same plane as the flat portion.

9. The electronic device of claim 1, further comprising a processor,
   wherein the processor detects a position change of the first structure with respect to the second structure at least based on a signal corresponding to the movement detected using the sensing circuit.

10. The electronic device of claim 1, wherein the mechanical button comprises,
    a key top disposed to be exposed to outside of the second side wall or the third side wall;
    a locking portion coupled to the key top, and blocking the key button from escaping inside the second side wall or the third side wall; and
    a contact portion coupled to the locking portion, and disposed to contact the sensing circuit.

11. The electronic device of claim 10, wherein the contact portion is formed of a conductive material, and wherein the sensing circuit detects a change of capacitance generated by the contact portion.

* * * * *